US012315006B2

(12) United States Patent
Liila et al.

(10) Patent No.: US 12,315,006 B2
(45) Date of Patent: May 27, 2025

(54) MACHINE LEARNING FOR ACTIVITY MONITORING AND VALIDITY IDENTIFICATION

(71) Applicant: MatrixCare, Inc., Bloomington, MN (US)

(72) Inventors: Jill Liila, Chaska, MN (US); Nate Sukhtipyaroge, Eagan, MN (US); Margaret Anhalt, St. Paul, MN (US)

(73) Assignee: MatrixCare, Inc., Bloomington, MN (US)

( * ) Notice: Subject to any disclaimer, the term of this patent is extended or adjusted under 35 U.S.C. 154(b) by 58 days.

(21) Appl. No.: 18/163,501

(22) Filed: Feb. 2, 2023

(65) Prior Publication Data

US 2023/0306504 A1 Sep. 28, 2023

Related U.S. Application Data

(60) Provisional application No. 63/322,581, filed on Mar. 22, 2022.

(51) Int. Cl.
*G06Q 40/02* (2023.01)

(52) U.S. Cl.
CPC ................... *G06Q 40/02* (2013.01)

(58) Field of Classification Search
CPC ..................................... G06Q 40/00
USPC ......................................... 705/35
See application file for complete search history.

(56) References Cited

U.S. PATENT DOCUMENTS

| | | | | |
|---|---|---|---|---|
| 6,351,698 B1* | 2/2002 | Kubota | ............... | G01C 21/3608 |
| | | | | 704/E15.045 |
| 8,185,191 B1* | 5/2012 | Shapiro | .................. | A61B 5/024 |
| | | | | 600/509 |
| 9,082,072 B1* | 7/2015 | Wedding, Jr. | .......... | G06Q 40/08 |
| 2006/0001545 A1* | 1/2006 | Wolf | ..................... | A47K 3/001 |
| | | | | 340/686.1 |
| 2009/0240170 A1* | 9/2009 | Rowley | ................ | A61B 5/6831 |
| | | | | 600/595 |
| 2013/0122849 A1* | 5/2013 | Doezema | ........... | G08B 21/0446 |
| | | | | 455/404.1 |
| 2013/0143519 A1* | 6/2013 | Doezema | ............... | A61B 5/681 |
| | | | | 455/404.2 |
| 2014/0267263 A1* | 9/2014 | Beckwith | ................ | G06T 15/08 |
| | | | | 345/424 |
| 2014/0268353 A1* | 9/2014 | Fujimura | ........... | G02B 27/0101 |
| | | | | 359/630 |
| 2014/0276549 A1* | 9/2014 | Osorio | ................... | A61B 5/165 |
| | | | | 604/503 |

(Continued)

Primary Examiner — Kirsten S Apple
(74) Attorney, Agent, or Firm — Patterson + Sheridan, LLP

(57) ABSTRACT

Techniques for improved machine learning are provided. Activity data describing an activity for a financial account of a resident in a residential care facility is received, and a set of attributes corresponding to the activity is extracted from the activity data, comprising determining a first attribute of the set of attributes by processing unstructured text associated with the activity using one or more natural language processing techniques. A validity score is generated by processing the set of attributes using a trained machine learning model, where the validity score indicates a probability that the activity is valid. In response to determining that the validity score is below a defined threshold, one or more interventions are initiated for the resident.

20 Claims, 15 Drawing Sheets

(56) References Cited

U.S. PATENT DOCUMENTS

| | | | |
|---|---|---|---|
| 2014/0277939 A1* | 9/2014 | Ren | G01C 21/3638 |
| | | | 701/36 |
| 2015/0187016 A1* | 7/2015 | Adams | G06Q 40/08 |
| | | | 705/4 |
| 2016/0165387 A1* | 6/2016 | Nhu | H04W 4/80 |
| | | | 455/41.1 |
| 2018/0000385 A1* | 1/2018 | Heaton | G08B 25/016 |
| 2018/0018864 A1* | 1/2018 | Baker | G08B 21/182 |
| 2018/0228404 A1* | 8/2018 | Bhunia | A61B 5/6817 |
| 2018/0228405 A1* | 8/2018 | Burwinkle | G16H 40/60 |
| 2018/0357879 A1* | 12/2018 | Negre | G06N 5/047 |
| 2019/0099114 A1* | 4/2019 | Mouradian | A61B 5/681 |
| 2019/0180879 A1* | 6/2019 | Jain | G16H 10/20 |
| 2019/0320945 A1* | 10/2019 | Johnson | G16H 80/00 |

* cited by examiner

MACHINE LEARNING FOR ACTIVITY MONITORING AND VALIDITY IDENTIFICATION

CROSS-REFERENCE TO RELATED APPLICATIONS

This application claims priority to U.S. Provisional Patent Application No. 63/322,581, filed Mar. 22, 2022, the entire content of which is incorporated herein by reference in its entirety.

INTRODUCTION

Embodiments of the present disclosure relate to machine learning. More specifically, embodiments of the present disclosure relate to using machine learning to monitor user activity.

A wide variety of healthcare settings, such as in residential care facilities (e.g., nursing homes), help to manage or monitor some or all of the finances of some or all of the residents. For example, many long-term residential care facilities allow residents to use trust accounts, managed by the facility, to hold monetary funds (often in relatively small amounts). Residents can use such funds for a variety of purposes, ranging from vending machines, services such as haircuts, and the like. In many cases, these accounts are funded by external sources, such as social security, personal savings, family, and the like. Conventionally, there is little oversight as to how residents use the funds in such accounts.

Accordingly, in many conventional facilities, a range of issues can arise in connection to such funds. For example, theft or other financial abuse is distressingly common, such as where individuals with ill-intent (which can include facility staff, third parties engaging in scams or deception, family, and the like) siphon money from these accounts using deception or force. These concerns are particularly prevalent when the resident suffers from declining mental health, which often makes elder residents targets for fraud.

Conventionally, caregivers and family rely on relatively infrequent reviews of the accounts to identify problematic activity. However, such conventional approaches are entirely subjective (relying on the experience or knowledge of the individual to recognize possible concerns), and it is simply impossible to evaluate all the relevant data in order to identify potential fraud.

Improved systems and techniques to automatically monitor activity are needed.

SUMMARY

According to one embodiment presented in this disclosure, a method is provided. The method includes: receiving activity data describing a first activity for a financial account of a first resident in a residential care facility; extracting, from the activity data, a first set of attributes corresponding to the first activity, comprising: determining a first attribute of the first set of attributes by processing unstructured text associated with the first activity using one or more natural language processing techniques; generating a first validity score by processing the first set of attributes using a trained machine learning model, wherein the first validity score indicates a probability that the first activity is valid; and in response to determining that the first validity score is below a defined threshold, initiating one or more interventions for the first resident.

According to one embodiment presented in this disclosure, a method is provided. The method includes: receiving historical data describing activity for a financial account of a first resident in a residential care facility; extracting, from the historical data, a set of attributes corresponding to an activity, comprising: determining a first attribute of the set of attributes by processing unstructured text associated with the activity using one or more natural language processing techniques; training a machine learning model to generate validity scores based on the set of attributes, wherein the validity scores indicate probability that financial account activity is valid; and deploying the trained machine learning model.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
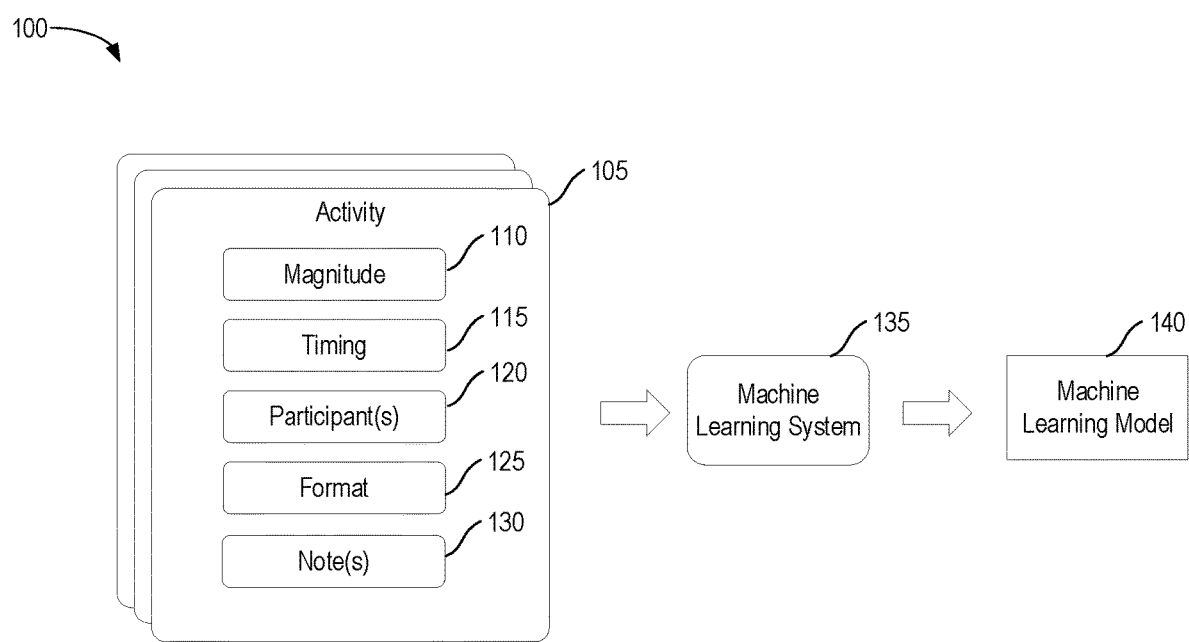
FIG. 1 depicts an example workflow for training machine learning models based on historical data.

Aspects of the present disclosure provide apparatuses, methods, processing systems, and computer-readable mediums for improved machine learning to monitor resident accounts and identify problematic or fraudulent activity.

In some embodiments, a machine learning model (also referred to in some aspects as a validity model) can be trained to assess financial account activity (such as deposits to trust accounts managed by a healthcare facility, withdrawals or disbursements from such accounts, and the like) to identify fraudulent or otherwise problematic activity, thereby improving care (e.g., by providing mental health evaluations when problematic or inappropriate activity becomes common), and preventing potentially significant negative financial outcomes. In some examples, the machine learning techniques described herein are used to monitor trust accounts holding funds managed by a residential care facility on behalf of a resident. However, aspects of the present disclosure are readily applicable to monitor activity for a wide variety of financial accounts. In some embodiments, by monitoring for problematic resident activity, the system is able to identify those in need of additional care (such as due to declining mental health), and can assist with reallocating resources and driving targeted interventions to help mitigate, prevent, or reduce the effect of such issues. For example, the system may identify a trend of troublesome activity, and suggest or initiate a mental health evaluation, counseling or therapy, or other interventions to help the resident. As used herein, a resident (also referred to herein as a user, an individual, or a patient) is an individual that has some or all of their financial activity managed or monitored to detect fraud or other problematic activity. Such residents may be an individual that resides in a care facility, which may include in-home care, communal facilities, and the like.

In conventional settings, caretakers must rely on subjective assessments (e.g., looking for unusually large transactions or requests) to perform such analysis. In addition to this inherently subjective and inaccurate approach, some conventional systems rely on manual identification of the potential risk factors for resident activity. However, these risk factors are similarly subjective and uncertain, and vary depending on the particular resident. Moreover, the vast number and variety of residents and factors that affect resident activity, as well as the significant amounts of data available for each resident, render such analysis impossible to adequately perform manually or mentally. Aspects of the present disclosure can not only reduce or prevent this subjective review, but can further prevent wasted time and computational expense spent reviewing vast amounts of irrelevant data. Further, aspects of the present disclosure enable more accurate validity evaluations, more efficient use of computational resources, and overall improved outcomes for users who may be at risk.

Embodiments of the present disclosure can generally enable proactive and quality care for residents, as well as dynamic and targeted interventions, and that help to prevent or reduce adverse events due to invalid or problematic activity, as well as declining mental acuity. This autonomous and continuous monitoring with respect to individual residents (as well as across groups of users, in some aspects) enables a wide variety of improved results, including not only improved outcomes for the users (e.g., reduced fraud, early identification of potential mental health issues, targeted interventions, and the like) but also improved computational efficiency and accuracy of the evaluation and solution process.

In some embodiments, a variety of historical activity data can be collected and evaluated to train one or more machine learning models. During such training, the machine learning model(s) can learn a set of features (e.g., resident attributes and/or activity attributes) and/or a set of weights for such features. These features and weights can then be used to automatically and efficiently process new activity data in order to identify potential concerns for problematic transactions. In some aspects, the model may be trained during a training phase, and then deployed as a static model that, once deployed, remains fixed. In other embodiments, the model may be refined or updated (either periodically or upon specified criteria). That is, during use in detecting and intervening in potential problems, the model may be refined based on feedback from users, caregivers, and the like. For example, if a user indicates that a given transaction was fraudulent (regardless of whether the model identified the fraud), the model may be refined based on this indication. Similarly, if a user indicates that an activity was appropriate, the model may be refined to reflect this new data.

In embodiments, the machine learning model(s) can generally be used to generate risk or validity scores or classifications for activity (including deposits and withdrawals to trust accounts) based on attributes of the activity and/or resident. For example, the system may determine or extract the magnitude of the activity (e.g., the size of a withdrawal), the recipient (e.g., who received or requested the funds), the timing of the activity (e.g., whether it occurred overnight), the form or format (e.g., whether the disbursement was in cash or in the form of a check), and the like. In some embodiments, the system further extracts resident attributes, such as demographics (e.g., age, gender, marital status, and the like), health conditions, clinical assessments, medications, and the like. In some embodiments, the attributes include both structured data (such as age) as well as unstructured data (e.g., natural language notes or reasons for the activity, provided by the resident or recipient). These attributes can then be processed as input to the machine learning model(s), which can generate a validity score and/or classification (e.g., indicating low, moderate, or high risk of fraud) for the activity. In some embodiments, the models can additionally be used to monitor and identify changes or trends in the risk (e.g., over time), which can help identify residents with changing or declining mental health. In these ways, the machine learning models can help drive specific and targeted interventions and assistance to improve user outcomes and reduce wasted resources and computational expense.

Example Workflow for Training Machine Learning Models using Historical Data

FIG. 1 depicts an example workflow 100 for training machine learning models based on historical data.

In the illustrated workflow 100, a set of historical data 105 is evaluated by a machine learning system 135 to generate one or more machine learning models 140. In embodiments, the machine learning system 135 may be implemented using hardware, software, or a combination of hardware and software. The historical data 105 generally includes data or information associated with one or more prior activities, such as withdrawals and/or deposits to resident trust accounts, from one or more prior points in time. That is, the historical data 105 may include, for one or more transactions or activities, a set of attributes associated with the activity. In some embodiments, the historical data 105 may include data for activities relating to trust accounts of one or more residents (also referred to as users or patients) residing in one or more long-term care facilities. The historical data 105 may generally be stored in any suitable location. For example, the historical data 105 may be stored within the machine learning system 135, or may be stored in one or more remote repositories, such as in a cloud storage system.

In the illustrated example, the historical data 105 includes, for each activity reflected in the data, an indication of the magnitude 110 (e.g., the amount of money that was transferred), the timing 115 of the activity, participants 120 (e.g., one or more attributes of the resident associated with the account, one or more attributes of the recipient or depositor of the funds, and the like), the format 125 (e.g., whether the activity was a cash withdrawal, a check payable to cash, a check written to an individual, a credit card payment, and the like), and notes 130 (e.g., natural language text explaining the reason for the activity). In some embodiments, as discussed above, the historical data 105 includes data for multiple activities associated with any number of residents. That is, for a given resident, the historical data 105 may include multiple sets of attributes, one for each activity.

In some embodiments, the historical data 105 may be collectively stored in a single data structure. For example, the magnitude 110, timing 115, participants 120, format 125, and natural language notes 130 may each be represented in an activity profile for each activity. In other embodiments, some or all of the data (such as attributes or characteristics of the resident) may be stored in other locations. In some portions of the present discussion, the various components of the historical data 105 are described with reference to a single activity for conceptual clarity (e.g., the magnitude 110 of a single transaction). However, it is to be understood that the historical data 105 can generally include such data for any number of transactions.

The magnitude 110 generally corresponds to the size of the activity. For example, the magnitude 110 may indicate the total amount of money transferred (e.g., in an appropriate currency for the locale) for the activity, the amount of money over or under a defined threshold value (e.g., an amount set by the resident or a caregiver), and the like. The timing 115 generally indicates when the activity or transfer occurred. Depending on the particular implementation, the timing 115 may include the time of day, the day of the week, the time of month, the time of year, and the like. In some embodiments, the timing 115 may additionally or alternatively indicate whether the activity occurred during defined times (or outside of defined times), such as overnight, as specified by the resident or another user.

As discussed in more detail below, the participants 120 generally correspond to various attributes of one or more individuals related to the activity. For example, in the case of a deposit, the participants 120 may include the depositor (e.g., the source of the funds), the user that actually handled the deposit (e.g., the caregiver that placed the money into a lockbox or other storage) and the resident. In the case of withdrawals, the participants 120 may include the resident, the individual that actually withdrew or approved the withdrawal (e.g., the caregiver that removed the money from a lockbox to be disbursed), the recipient of the funds (e.g., the barber, if the transaction was for a haircut), and the like.

In some embodiments, the specific attributes included in the participants 120 are curated or selected based on their relevance to activity validity. For example, in one aspect, a user (e.g., a clinician) may manually specify attributes that are highly correlated with transaction validity. In some embodiments, some or all of the conditions or assessments may be inferred or learned (e.g., using one or more feature selection techniques).

For example, in some embodiments, the participant attributes may include information such as whether it is a new recipient or depositor (e.g., an individual or entity to whom the specific resident, or any resident in the facility, has previously provided money), whether the recipient or depositor is an individual or legal entity (such as a corporation or business), whether the recipient or depositor is local or remote (e.g., whether the recipient is within a defined proximity or geographic region with respect to the facility), and the like.

In some embodiments, attributes of the resident can include their age, demographics, marital status, mental condition or other health status, average activity (e.g., the average amount of a single transaction for the resident, the average amount they spend per month, the average number or frequency of transactions, and the like), and the like.

The format 125 of the activity can generally indicate the form of the withdrawal or deposit, such as whether it was cash, a cashier's check, a check payable to a specific recipient, a check payable to cash, an electronic transfer, and the like.

The notes 130 can generally include any natural language description associated with the activity. For example, the resident may (optionally) report a reason for the withdrawal (e.g., "this is for a haircut," or "it is my grandson's birthday"). In some embodiments, the recipient may additionally or alternatively provide a reason (such as on an invoice). In an embodiment, the notes 130 may include written text, verbal recordings (which may be converted to written text using speech-to-text algorithms), and the like. Additionally, the notes 130 may be recorded by the participants themselves (e.g., written down by the resident), by a caregiver or other user that manages the funds, and the like. In some embodiments, as discussed in more detail below, these notes 130 can be evaluated (e.g., using natural language processing techniques or machine learning models) to help quantify or predict the validity of the activity.

For example, in some embodiments, the machine learning system 135 may identify defined keywords in the text (e.g., those which have been previously-associated or correlated with fraud), sentiment analysis, and the like in order to score each note 130. Such a score may be input to the broader machine learning model 140. In some embodiments, the machine learning system 135 can identify patterns in the notes 130, such as deviations from the norm. For example, if the activity 105 usually includes a note (e.g., above some defined threshold) but the recent activities do not, the system may learn to infer fraud. Similarly, if the activity 105 generally did not include notes but new activity does, or if the author of the note has changed, the model may learn to generate higher scores indicating potential fraud.

Although the illustrated historical data 105 includes several specific components including magnitude 110, timing 115, participants 120, format 125, and natural language notes 130, in some embodiments, the historical data 105 used by the machine learning system 135 may include fewer components (e.g., a subset of the illustrated examples) or additional components not depicted. Additionally, though the illustrated example provides general groupings of attributes to aid understanding, in some embodiments, the historical data 105 may be represented using any number of groups. That is, the individual attributes (e.g., individual attributes of the participants) may simply be used as input to the machine learning system 135, without reference to any larger grouping or component.

Additionally, though the above discussion relates to receiving specified sets of data (e.g., specified attributes), in some aspects, the machine learning system 135 may receive a broader set of data (e.g., all attributes of the resident). The machine learning system 130 may then select which subset of the data to consider (e.g., using feature selection techniques, as discussed above, or based on the defined set of features to be used), or may assign weights to each feature (e.g., using machine learning) to generate accurate validity scores.

As illustrated, the machine learning system 135 generates one or more machine learning models 140 based on the historical data 105. The machine learning model 140 generally specifies a set of weights for the various features or attributes of the historical data 105. That is, the machine learning model 140 may include a set of weights (e.g., edge weights in a feedforward neural network) that can be used to generate an overall validity score for the activity.

In some embodiments, the specific features considered by the machine learning model 140 (e.g., the specific participant attributes or activity attributes) are manually defined and curated. For example, the specific features may be defined by a subject-matter expert. In other embodiments, the specific features are learned during a training phase.

For example, the machine learning system 135 may process the historical data 105 for a given activity as input to the machine learning model 140, and compare the generated validity score to the ground-truth (e.g., an indication as to whether the activity was valid). The difference between the generated and actual score can be used to refine the weights of the machine learning model 140, and the model can be iteratively refined (e.g., using data from multiple residents and/or multiple points in time) to generate accurate validity scores.

As used herein, activity is said to be valid if it corresponds to an appropriate source or use of funds, as compared to invalid use such as due to scams. For example, withdrawing a small amount of cash for a vending machine may be valid, while withdrawing hundreds of dollars per day for the vending machine may be invalid. In some embodiments, the validity of a transaction may indicate the appropriateness of the transaction overall (e.g., whether it is a healthy or good decision), rather than whether the transaction is strictly fraudulent. For example, an aging resident with declining mental health may spend large amounts of money on useless items. Though such activity may not be fraudulent, in some embodiments, it may be labeled as invalid or inappropriate. In some embodiments, the validity of a given activity or transaction is defined by users and/or on a per-resident basis. For example, a given activity may be valid for some residents but invalid for others. Such validity may be defined by the resident themselves (if they are mentally sound), by one or more caregivers (such as nursing staff, family members, or the power of attorney for a resident), and the like.

In some embodiments, during or after training, the machine learning system 135 may prune the machine learning model 140 based in part on the learned weights. For example, if the learned weight for a given feature (e.g., a specific attribute) is below some threshold (e.g., within a threshold distance from zero), the machine learning system 135 may determine that the feature has no impact (or negligible impact) on the validity of the transaction. Based on this determination, the machine learning system 135 may cull or remove this feature from the machine learning model 140 (e.g., by removing one or more neurons, in the case of a neural network). For future evaluations, the machine learning system 135 need not receive data relating to these removed features (and may refrain from processing or evaluating the data if it is received). In this way, the machine learning model 140 can be used more efficiently (e.g., with reduced computational expense and latency) to yield accurate validity evaluations.

In some embodiments, the machine learning system 135 can generate multiple machine learning models 140. For example, a separate machine learning model 140 may be generated for each facility (e.g., with a unique model for each specific long-term residential care facility), for each region (e.g., with a unique model for each country), and/or for each resident. This may allow the machine learning system 135 to account for resident-specific, facility-specific, region-specific, or culture-specific changes. In other embodiments, the machine learning system 135 generates a universal machine learning model 140. In at least one embodiment, the machine learning model 140 may use similar considerations (e.g., location, region, and the like) as an input feature.

In at least one embodiment, the machine learning system 135 can train or retrieve a global machine learning model 140 trained based on historical data 105 for a variety of residents. The machine learning system 135 can then further train, fine-tune, or refine the global model for each individual resident based on the specific resident data. That is, the machine learning system 135 may use one or more prior transactions for a given resident (with known validities) to refine the global model, thereby generating a personalized machine learning model 140 that learns to account for the specific peculiarities of the resident. This can result in significantly improved models, particularly when the resident differs from other similar residents (e.g., spending significantly more or significantly less than others of the same age, spending money on different or unique things, and the like).

In some embodiments, the machine learning system 135 outputs the machine learning model 140 to one or more other systems for use. That is, the machine learning system 135 may distribute the machine learning model 140 to one or more downstream systems, each responsible for one or more facilities or residents. For example, the machine learning system 135 may deploy the machine learning model(s) 140 to one or more servers associated with specific care facilities, and these servers may use the model(s) to evaluate account activity for residents at the specific facility. In at least one embodiment, the machine learning system 135 can itself use the machine learning model to evaluate activity across one or more locations.

Figure 2:
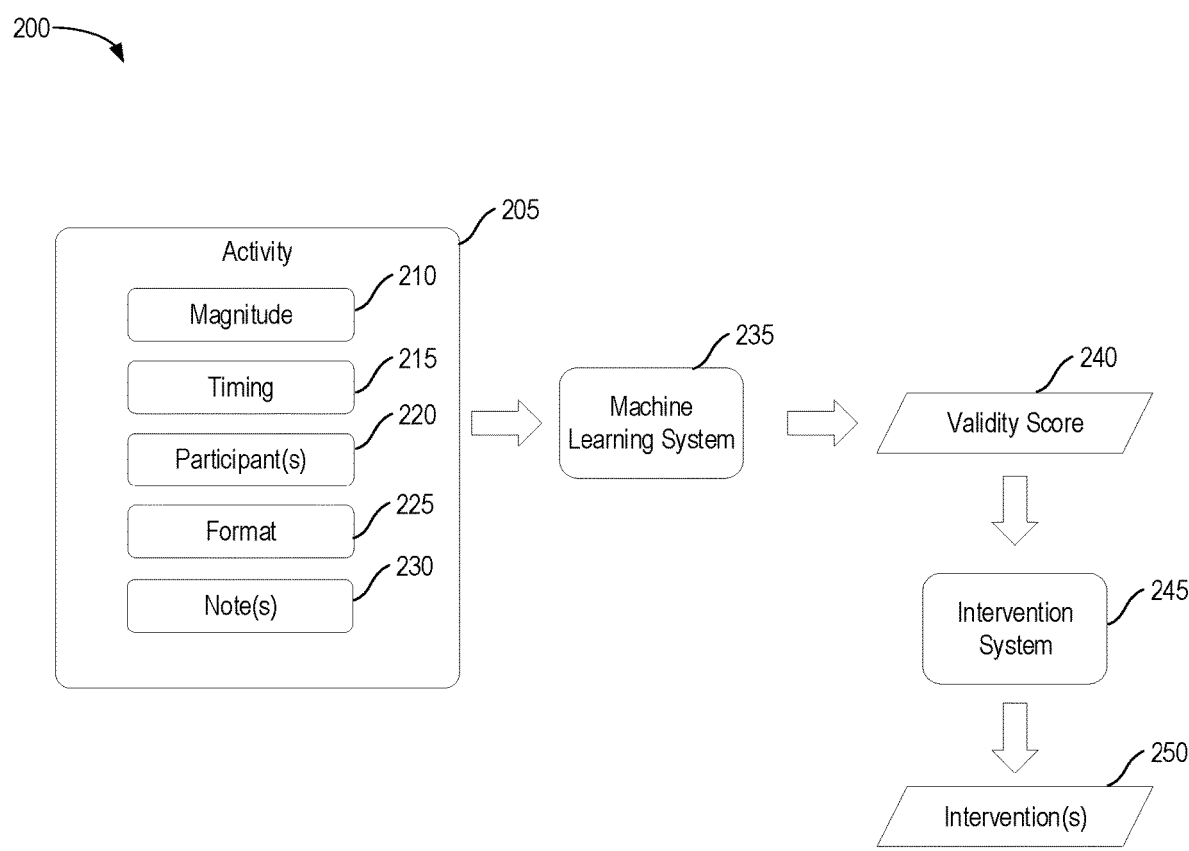
FIG. 2 depicts an example workflow for generating validity scores and interventions using machine learning models.

Example Workflow for Generating Validity Scores and Interventions using Machine Learning FIG. 2 depicts an example workflow 200 for generating validity scores and interventions using machine learning models.

In the illustrated workflow 200, activity data 205 is evaluated by a machine learning system 235 (which may correspond to the machine learning system 135 of FIG. 1) using one or more machine learning models (e.g., machine learning model 140 of FIG. 1) to generate one or more validity score(s) 240. In embodiments, the machine learning system 235 may be implemented using hardware, software, or a combination of hardware and software. In some embodiments, the machine learning system 235 that uses the machine learning model(s) is the same as the system that trains the machine learning model. In other aspects, as discussed above, the machine learning system 235 may differ from the system that trained the model.

The activity data 205 generally includes data or information associated with one or more activities of a resident (also referred to as a user, a patient, or an individual) with respect to a monetary fund or account. That is, the activity data 205 may include, for one or more activities or transactions, a set of relevant attributes associated with the activity. In some embodiments, the activity data 205 corresponds to financial transactions of one or more residents residing in one or more long-term care facilities. In at least one embodiment, the activity data 205 corresponds to withdrawals, deposits, and/or transfers related to one or more trust accounts maintained by the facility. The activity data 205 may generally be stored in any suitable location. For example, the activity data 205 may be stored within the machine learning system 235, or may be stored in one or more remote repositories, such as in a cloud storage system. In at least one embodiment, the activity data 205 is distributed across multiple data stores.

In the illustrated example, the activity data 205 includes, for each activity or transaction reflected in the data, a magnitude 210 of the activity, the timing 215 of the activity, the participants 220 of the activity, the format 225 of the activity, and zero or more natural language notes 230 related to the activity.

As discussed above, the magnitude 210 generally corresponds to the size of the activity (e.g., the total monetary value of the transaction), the timing 215 generally indicates when the activity or transfer occurred, the participants 220 generally correspond to various attributes of one or more individuals related to the activity, the format 225 can generally indicate the form of the activity, and the notes 230 can generally include any natural language description associated with the activity.

Although the illustrated activity data 205 includes several discrete components for conceptual clarity, in some embodiments, the activity data 205 may include fewer components (e.g., a subset of the illustrated examples) or additional components not depicted, depending on what is available and the particular implementation. Additionally, though the illustrated example provides general groupings of attributes to aid understanding, in some embodiments, the activity data 205 may be represented using any number of groups. That is, the individual attributes may simply be used as input to the machine learning system 235, without reference to any larger grouping or component.

Additionally, though the above discussion relates to receiving specified sets of data (e.g., specified attributes), in some aspects, the machine learning system 235 may receive a broader set of data (e.g., all diagnoses or conditions of the residents) and select which subset of the data to consider (e.g., based on the features specified in the machine learning model).

In the illustrated example, the activity data 205 is used to generate one or more validity scores 240. The validity scores 240 can generally include one or more scores for one or more transactions of one or more residents. For example, in one aspect, the validity scores 240 can include one score for each respective transaction. In one aspect, the validity scores 240 can include multiple scores for a single activity, such as a first score indicating the predicted validity of the activity when viewed in isolation (e.g., without reference to surrounding activity), and a second score indicating the predicted validity of an index activity when contextual activity (e.g., one or more activities prior to or after the index activity) is considered. As discussed above, the validity scores 240 can generally indicate the probability or likelihood that the activity is valid. Further, as discussed above, the validity of a given transaction or activity may be defined not strictly based on whether it is fraudulent, but based on whether it is considered appropriate for the specific resident.

As discussed above, the machine learning system 235 can generate the validity scores 240 by identifying or extracting the relevant attributes from the activity data 205 (e.g., the relevant features, as indicated by the machine learning model), and processing these attributes using the weights and architecture of the machine learning model to generate an overall validity score 240 for the transaction based on the attributes. In some embodiments, the validity score 240 can additionally or alternatively include a classification or category (e.g., low, moderate, or high probability of being valid), determined based on one or more threshold values for the score.

In some embodiments, the machine learning system 235 can use a combination of activity rules and machine learning to generate the validity scores 240. For example, the machine learning system 235 may first evaluate each activity in view of a set of defined rules (which may include resident-specific rules), such as a rule indicating that the resident should not make cash withdrawals, that a specific recipient should be forbidden from receiving funds, and the like. If these rules are satisfied, the machine learning system 235 may then use the machine learning model(s) to further evaluate the activity. In this way, the machine learning system 235 can reduce computational expense by only processing a subset of transactions (e.g., those that are potentially valid because they do not violate any rules), while others (e.g., those that violate one or more rules) can be immediately marked as invalid.

In embodiments, the validity scores 240 can be used for a wide variety of applications. In some embodiments, the validity scores 240 are used to define or predict resource allocations, interventions, and the like. In the illustrated example, the validity scores 240 are optionally provided to an intervention system 245, which can generate one or more interventions 250 based on the validity scores 240. In some embodiments, these interventions 250 can include, for example, an alert to the resident or trusted caregiver (e.g., a family member), blocking the transaction, initiating an investigation (e.g., instructing a caregiver to speak with the resident about the activity), and the like.

In some embodiments, the intervention system 245 can identify changes in the validity scores 240 for each resident over time. In one such embodiment, one or more of the generated interventions 250 may include alerts when the average validity score 240 exceeds some threshold, when a specified number or percentage of the resident's transactions are predicted to be invalid, and the like. In one such embodiment, the intervention system 245 may transmit an alert (e.g., to one or more clinicians or family members) indicating that the resident may need a mental evaluation, that the resident may be falling prey to a scam, and the like. In some embodiments, the alert may include information relating to the suspicious activity, such as the magnitude of the transaction(s), the recipient(s), and the like. In at least one embodiment, this alert is transmitted to an individual who is not involved, associated, or otherwise implicated in the activity. For example, rather than requesting that the authorizing caregiver (e.g., that approved or otherwise carried out the withdrawal) or the individual that authored the reason note(s) verify the activity, the system may identify and transmit the alert to a third party such as a compliance officer, a management employee, and the like.

In at least one embodiment, the alert may include instructions or suggestions with respect to specific prophylactic interventions 245 for the user, such as increased monitoring or check-ins by caregivers, renewed or more frequent clinical assessments for changing conditions, therapy sessions, and the like.

Advantageously, the automatically generated validity scores 240 and/or interventions 250 can significantly improve the outcomes of the residents, helping to identify risks at early stages, thereby preventing significant harm (as well as further deterioration, in the case of mental decline).

Additionally, the autonomous nature of the machine learning system 235 enables improved computational efficiency and accuracy, as the validity scores 240 and/or interventions 250 are generated objectively (as opposed to the subjective judgment of clinicians or other users), as well as quickly and with minimal computational expense. That is, as the scores can be automatically updated whenever new activity data is available, users need not manually retrieve and review the relevant data (which incurs wasted computational expense, as well as wasted time for the user).

Further, in some embodiments, the machine learning system 235 can generate validity scores 240 during specified times (e.g., off-peak hours, such as overnight) to provide improved load balancing on the underlying computational systems. For example, rather than requiring caregivers to retrieve and review activity data for all residents in a facility to determine if any problematic actions occurred, the machine learning system 235 can automatically identify such concerns, and use the machine learning model(s) to generate validity scores 240 before a given shift begins (or as the transactions occur). This can transfer the computational burden, which may include both processing power of the storage repositories and access terminals, as well as bandwidth over one or more networks, to off-peak times, thereby reducing congestion on the system during ordinary (e.g., daytime) use and taking advantage of extra resources that are available during the non-peak (e.g., overnight) hours.

In these ways, embodiments of the present disclosure can significantly improve resident outcomes while simultaneously improving the operations of the computers and/or networks themselves (at least through improved and more accurate scores, as well as better load balancing of the computational burdens).

Example Workflow for Refining Machine Learning Models

Figure 3:
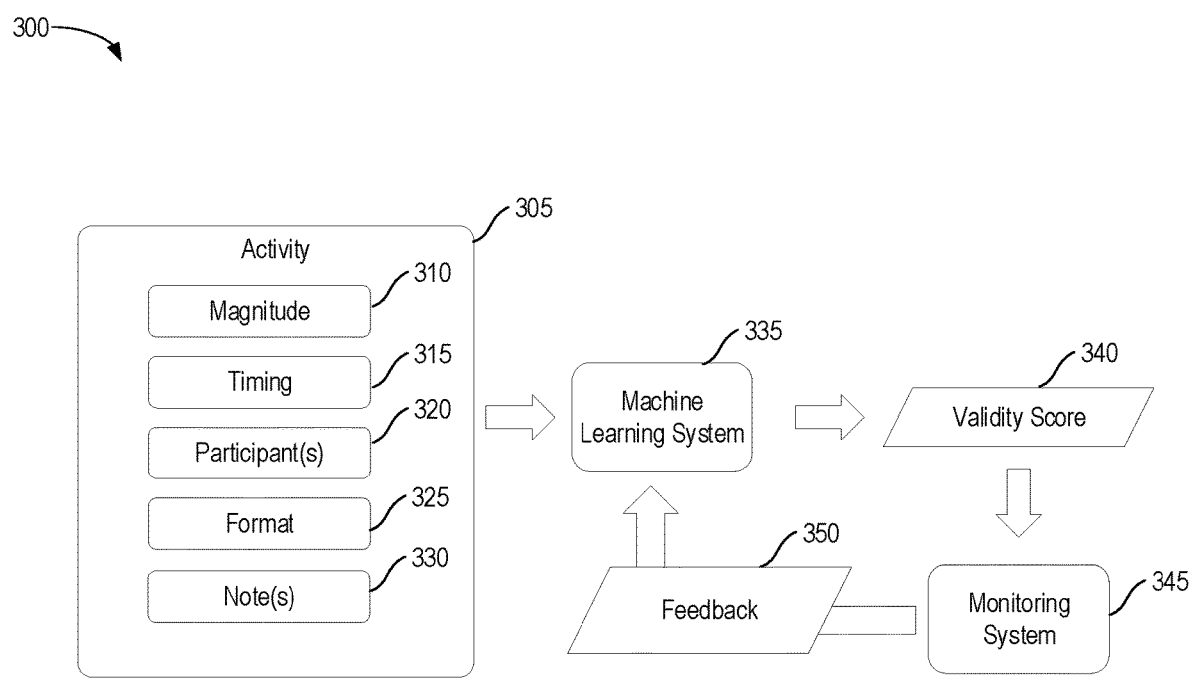
FIG. 3 depicts an example workflow for refining machine learning models to evaluate activity data.

FIG. 3 depicts an example workflow 300 for refining machine learning models to evaluate activity data. In some embodiments, the workflow 300 is performed using trained models, such as the machine learning models 140 of FIG. 1.

The depicted workflow 300 differs from the workflow 200 of FIG. 2 in that it enables online refinement of the machine learning models based on updated information, thereby ensuring that the models can dynamically evaluate activity even when general conditions change or when resident preferences evolve. In the illustrated workflow 300, a set of activity data 305 is evaluated by a machine learning system 335 using one or more machine learning models (e.g., machine learning model 140 of FIG. 1) to generate and/or evaluate one or more activity scores 340. In embodiments, the machine learning system 335 may be implemented using hardware, software, or a combination of hardware and software. In some embodiments, the machine learning system 335 corresponds to the machine learning system 135 of FIG. 1, and/or the machine learning system 235 of FIG. 2. In other aspects, as discussed above, the machine learning system 335 may differ from the system that trained the model and/or generated the training data.

In some embodiments, the workflow 300 generally mirrors the workflow 200 of FIG. 2 to generate the validity scores 340. As discussed above, the activity data 305 generally includes data or information associated with one or more transactions of one or more residents (also referred to as patients or users). For example, the activity data 305 may include information relating to transactions (e.g., deposits and withdrawals) made with respect to one or more trust accounts of a one or more of residents residing in one or more long-term care facilities. The activity data 305 may generally be stored in any suitable location. For example, the activity data 305 may be stored within the machine learning system 335, or may be stored in one or more remote repositories, such as in a cloud storage system. In at least one embodiment, the activity data 305 is distributed across multiple data stores.

In the illustrated example, the activity data 305 includes, for each activity or transaction reflected in the data, a magnitude 310 of the activity, the timing 315 of the activity, the participants 320 of the activity, the format 325 of the activity, and zero or more natural language notes 330 related to the activity.

As discussed above, the magnitude 310 generally corresponds to the size of the activity (e.g., the total monetary value of the transaction), the timing 315 generally indicates when the activity or transfer occurred, the participants 320 generally correspond to various attributes of one or more individuals related to the activity, the format 325 can generally indicate the form of the activity, and the notes 330 can generally include any natural language description associated with the activity.

Although the illustrated activity data 305 includes several discrete components for conceptual clarity, in some embodiments, the activity data 305 may include fewer components (e.g., a subset of the illustrated examples) or additional components not depicted, depending on what is available and the particular implementation. Additionally, though the illustrated example provides general groupings of attributes to aid understanding, in some embodiments, the activity data 305 may be represented using any number of groups. That is, the individual attributes may simply be used as input to the machine learning system 335, without reference to any larger grouping or component.

Additionally, though the above discussion relates to receiving specified sets of data (e.g., specified attributes), in some aspects, the machine learning system 335 may receive a broader set of data (e.g., all diagnoses or conditions of the residents) and select which subset of the data to consider (e.g., based on the features specified in the machine learning model).

In the illustrated example, the activity data 305 is used to generate one or more validity scores 340, as discussed above. The validity scores 340 can generally include one or more scores for one or more transactions of one or more residents. As discussed above, the validity scores 340 can generally indicate the probability or likelihood that the activity is valid. Further, as discussed above, the validity of a given transaction or activity may be defined not strictly based on whether it is fraudulent, but based on whether it is considered appropriate for the specific resident.

As discussed above, the machine learning system 335 can generate the validity scores 340 by identifying or extracting the relevant attributes from the activity data 305 (e.g., the relevant features, as indicated by the machine learning model), and processing these attributes using the weights and architecture of the machine learning model to generate an overall validity score 340 for the transaction based on the attributes. In some embodiments, the validity score 340 can additionally or alternatively include a classification or category (e.g., low, moderate, or high probability of being valid), determined based on one or more threshold values for the score.

In some embodiments, the machine learning system 335 can use a combination of activity rules and machine learning to generate the validity scores 340. For example, the machine learning system 335 may first evaluate each activity in view of a set of defined rules (which may include resident-specific rules). If these rules are satisfied, the machine learning system 335 may then use the machine learning model(s) to further evaluate the activity. In this way, the machine learning system 335 can reduce computational expense by only processing a subset of transactions (e.g., those that are potentially valid because they do not violate any rules), while others (e.g., those that violate one or more rules) can be immediately marked as invalid.

In the illustrated workflow 300, once a validity score 340 has been generated, a monitoring system 345 can evaluate its accuracy. For example, the monitoring system 345 may periodically or continuous evaluate the activity data 305 or other sources of information to determine whether the activity has been flagged, reversed, investigated, or otherwise indicated to be problematic. In at least one embodiment, caregivers (which may include family members, or the resident themselves) can note that a transaction was valid or invalid, such as via natural language notes, or by selecting options (e.g., from a drop down or radio button in a GUI) indicating the validity of the transaction. Although depicted as a discrete system for conceptual clarity, in embodiments, the monitoring system 345 may be implemented as a stand-alone service, or as part of the machine learning system 335 (or another system).

In the illustrated workflow, the monitoring system 345 generates feedback 350 based on the monitored activity. In one embodiment, the monitoring system 345 can receive explicit update from users (e.g., caregivers) indicating whether an activity was invalid or inappropriate. In some embodiments, the monitoring system 345 generates new feedback 350 each time such feedback is provided. For example, if the data indicates that a given activity was inappropriate (e.g., because it was challenged, blocked, or reversed by a user), the monitoring system 345 may generate feedback 350 indicating the corresponding activity and attributes.

In at least one embodiment, the monitoring system 345 may also generate feedback 350 indicating that a transaction was appropriate or valid. For example, if the activity data 305 indicates that a given transaction has not been challenged or flagged for a threshold period of time (e.g., for a week, a month, and the like), the monitoring system 345 can generate feedback 350 indicating that the activity appears to be valid. In some embodiments, the threshold time used may be specified based on the attributes of the resident. For example, if more time may be allowed to elapse if the resident has a worse mental state and/or has no involved family to identify such problems, as compared to a resident with higher mental acuity and/or involved family monitoring the activity.

In the illustrated workflow 300, the machine learning system 335 uses the feedback 350 to refine the machine learning model(s) used to score resident activity. For example, if the feedback 350 indicates that a specific transaction was valid, the machine learning system 335 may use the transaction attributes (along with the resident's attributes in some embodiments) as input to the model in order to generate a new validity score 340. The machine learning system 335 can then compare this generated score to the ground-truth (e.g., based on the newly-learned fact that the transaction was valid), and use the resulting difference to refine the machine learning model(s). In this way, the machine learning system 335 can learn to generate better and more accurate validity scores 340 for future activity.

In some embodiments, as discussed above, the machine learning system 335 may perform this model refinement whenever new feedback 350 is received. In other embodiments, the machine learning system 335 may defer the refinement until specified hours (e.g., overnight, or during non-peak times) to reduce the computational burden of the refinement. In one such embodiment, the machine learning system 335 (or another system) can store the feedback 350 to be periodically used during such defined times.

Figure 4:
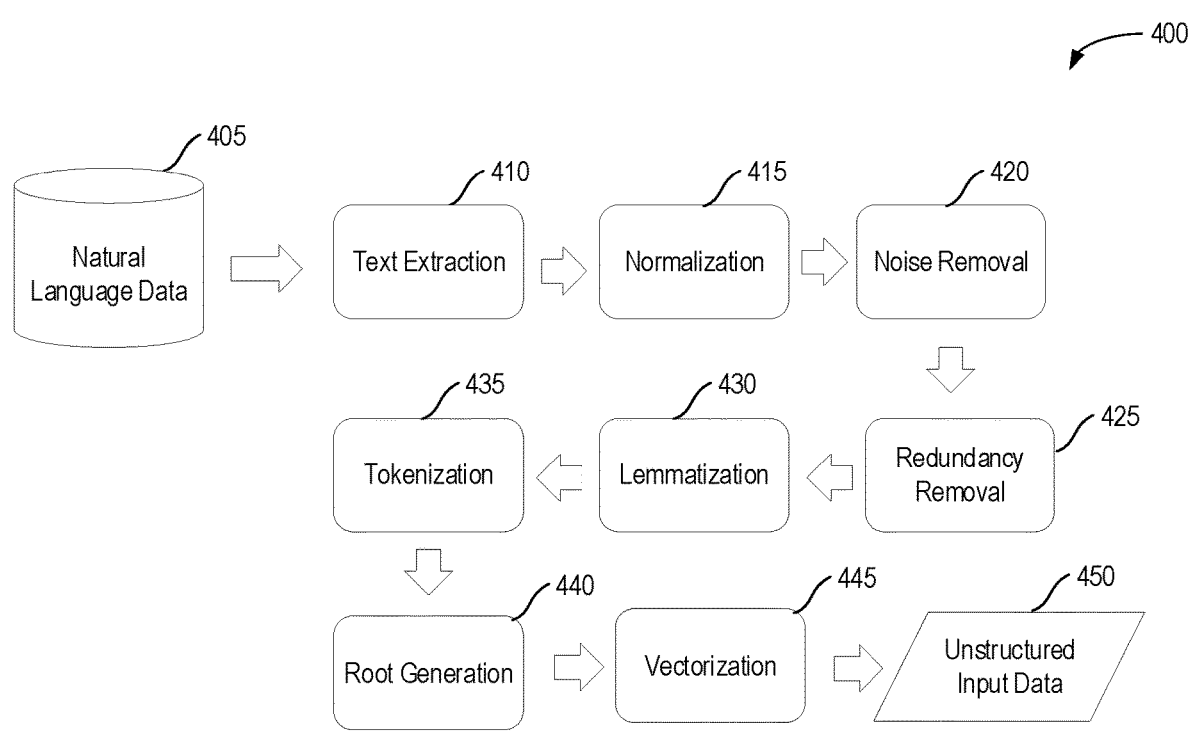
FIG. 4 depicts an example workflow for preprocessing unstructured data for improved machine learning.

Example Workflow for Preprocessing Unstructured Data for Improved Machine Learning FIG. 4 depicts an example workflow 400 for preprocessing unstructured data for improved machine learning. In some embodiments, the workflow 400 may be performed to process natural language data 405 for input to one or more machine learning models. In some embodiments, the workflow 400 is performed by one or more remote systems (e.g., by a cloud-based service). In other embodiments, the workflow 400 is performed by a machine learning system, such as machine learning system 135 of FIG. 1 and/or machine learning system 235 of FIG. 2. The workflow 400 may be used during training of machine learning models (e.g., to generate the training input) and/or during inferencing using the models (e.g., to generate input when generating a validity score for a transaction). That is, the workflow 400 may be used to transform or preprocess any natural language input, prior to it being used as input to the machine learning model(s) during training or inferencing.

In the illustrated workflow 400, natural language data 405 is received for processing to generate unstructured input data 450. In some embodiments, the workflow 400 is referred to as preprocessing to indicate that it is used to transform, refine, manage, or otherwise modify the natural language data 405 to improve its suitability for use with machine learning systems (or other downstream processing). In some embodiments, the natural language data 405 corresponds to notes relating to resident activity, such as the notes 130 of FIG. 1 and/or notes 230 of FIG. 2.

In some embodiments, preprocessing the data in the natural language data 405 may improve the ML training process by making the data more compatible with natural language processing, and ultimately for consumption by the ML model during training. Preprocessing can generally include a variety operations. Though the illustrated workflow 400 depicts a series of operations being performed sequentially for conceptual understanding, in embodiments, some or all of the operations may be performed in parallel. Similarly, in embodiments, the workflow 400 may include additional operations not depicted, or may include a subset of the depicted operations.

In the illustrated example, the natural language data 405 can first undergo text extraction 410. The text extraction 410 generally corresponds to extracting natural language text from an unstructured portion of the natural language data 405. For example, if the natural language data 405 includes a set of notes (e.g., notes written by a resident indicating reason(s) for one or more transactions), the text extraction 410 can include identifying and extracting these notes for evaluation. In some aspects, the notes may further include structured or semi-structured data that can undergo more traditional processing as needed, such as a timestamp indicating when the note was written or revised, an indication of the specific activity about which the note was written, the author of the note, and the like.

The normalization 415 can generally a wide variety of text normalization processes, such as converting all characters in the extracted text to lowercase, converting accented or foreign language characters to ASCII characters, expanding contractions, converting words to numeric form where applicable, converting dates to a standard date format, and the like.

Noise removal 420 can generally include identification and removal of portions of the extracted text that do not carry meaningful or probative value. That is, noise removal 420 may include removing characters, portions, or elements of the text that are not useful or meaningful in the ultimate computing task (e.g., computing a validity score), and/or that are not useful to human readers. For example, the noise removal 420 may include removing extra white or blank spaces, tabs, or lines, removing tags such as HTML, tags, and the like.

Redundancy removal 425 may generally correspond to identifying and eliminating or removing text corresponding to redundant elements (e.g., duplicate words), and/or the reduction of a sentence or phrase to a portion thereof that is most suitable for machine learning training or application. For example, the redundancy removal 425 may include eliminating verbs (which may be unhelpful in the machine learning task), conjunctions, or other extraneous words that do not aid the machine learning task.

Lemmatization 430 can generally include stemming and/or lemmatization of one or more words in the extracted text. This may include converting words from their inflectional or other form to a base form. For example, lemmatization 430 may include replacing "holding," "holds," and "held" with the base form "hold."

In one embodiment, tokenization 435 includes transforming or splitting elements in the extracted text (e.g., strings of characters) into smaller elements, also referred to as "tokens." For example, the tokenization 435 may include tokenizing a paragraph into a set of sentences, tokenizing a sentence into a set of words, transforming a word into a set of characters, and the like. In some embodiments, tokenization 435 can additionally or alternatively refer to the replacement of sensitive data with placeholder values for downstream processing. For example, text such as the personal address of the resident may be replaced or masked with a placeholder (referred to as a "token" in some aspects), allowing the remaining text to be evaluated without exposing this private information.

In an embodiment, root generation 440 can include reducing portion of the extracted text (e.g., a phrase or sentence) to its most relevant n-gram (e.g., a bigram) or root for downstream machine learning training and/or application.

Vectorization 445 may generally include converting the text into one or more objects that can be represented numerically (e.g., into a vector or tensor form). For example, the vectorization 445 may use one-hot encodings (e.g., where each element in the vector indicates the presence or absence of a given word, phrase, sentiment, or other concept, based on the value of the element). In some embodiments, the vectorization 445 can correspond to any word embedding vectors (e.g., generated using all or a portion of a trained machine learning model, such as the initial layer(s) of a feature extraction model). This resulting object can then be processed by downstream natural language processing algorithms or machine learning models to improve the ability of the system to evaluate the text (e.g., to drive more accurate depression risk scores).

As illustrated, the various preprocessing operations in the workflow 400 result in generation of unstructured input data 450. That is, the unstructured input data 450 corresponds to unstructured natural language data 405 that has undergone various preprocessing to improve its use with downstream machine learning models. The preprocessing workflow 400 can generally include any other suitable techniques for making text ingestion more efficient or accurate (either in a training phase of a machine learning model, or while generating an inference or prediction using a trained model). Generally, improving the results of this natural language processing can have significant positive impacts on the computational efficiency of processing the data downstream, as well as the eventual accuracy of the trained machine learning model(s).

In some embodiments, as discussed below, this unstructured input data 450 can be processed using one or more trained machine learning models to generate a score, for each note in the natural language data 405, indicating a likelihood, probability, or degree with which the note indicates that the activity is inappropriate or invalid. Such a score may be input to the broader model (e.g., the machine learning model 140 of FIG. 1) to generate a validity score for the transaction. In other embodiments, the unstructured input data 450 is itself input to the broader machine learning model.

Figure 5:
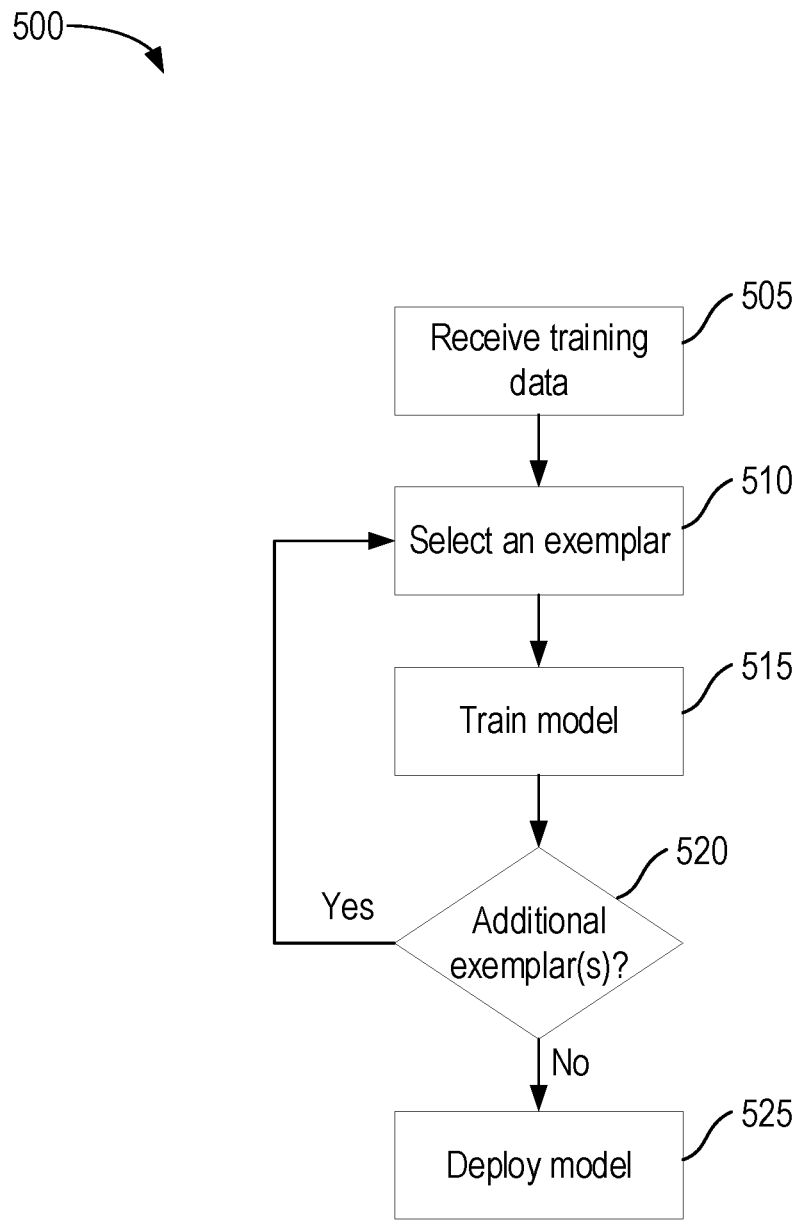
FIG. 5 is a flow diagram depicting an example method for training machine learning models to evaluate user depression.

Example Method for Training Machine Learning Models to Evaluate Activity Validity FIG. 5 is a flow diagram depicting an example method 500 for training machine learning models to evaluate user depression. In the illustrated embodiment, the method 500 is performed by a machine learning system, such as the machine learning system 135 of FIG. 1, the machine learning system 235 of FIG. 2, and/or the machine learning system 335 of FIG. 3. In other embodiments, the method 500 can be performed by other systems, such as dedicated training systems.

The method 500 begins at block 505, where the machine learning system receives training data. As discussed above, the training data may generally include data relating to one or more prior transactions or activities (such as with respect to one or more resident trust accounts), where the data indicates, for each respective activity, a set of attributes, characteristics, or features of the activity, as well as a label indicating whether the activity was valid or appropriate.

In embodiments, receiving the training data may include receiving it from one or more other systems (e.g., data aggregation or preprocessing systems), retrieving it from local or remote storage, and the like. In one embodiment, the training data can generally include multiple sets of resident attributes, where each set of attributes indicates the attributes or characteristics of a resident during a window of time immediately preceding and/or at the time of a transaction (e.g., within a defined window, such as one month prior, six months prior, and the like).

In some embodiments, the training data includes data from multiple residents, allowing a model to be trained to reflect broader patterns (e.g., average spending habits for residents, based at least in part on their age, demographics, and the like). In some embodiments, the training data includes data from a single resident, allowing a model to be trained or refined based on patterns for the specific resident.

At block 510, the machine learning system selects one of the exemplars included in the training data. As used herein, an exemplar refers to a set of attributes (e.g., corresponding to a defined or learned set of features) associated with a given activity. For example, the exemplar may include indications as to the magnitude and timing of the transaction, the demographics of the resident, the identity of the recipient, one or more natural language notes describing a reason for the activity, and the like.

Generally, the exemplar may be selected using any suitable criteria (including randomly or pseudo-randomly), as the machine learning system will use all exemplars during the training process. Although the illustrated example depicts selecting exemplars sequentially for conceptual clarity, in embodiments, the machine learning system may select and/or process multiple exemplars in parallel.

At block 515, the machine learning system trains the machine learning model based on the selected exemplar. For example, the machine learning system may use the attributes indicated in the exemplar to generate an output validity score or classification for the activity. As discussed above, this validity score can generally indicate the probability that the activity is valid or appropriate, with respect to the individual resident. In one such embodiment, lower values may indicate a lower probability that the activity is invalid or inappropriate, while a higher value indicates that the activity is more likely to be problematic.

During training, this score can then be compared against a ground-truth associated with the selected exemplar (e.g., an indication as to whether the activity was invalid). Based on this comparison, the parameters of the machine learning model can be updated. For example, if the generated validity score is relatively low but the activity was, in fact, labeled as invalid, the machine learning system may modify the parameters such that the attributes in the exemplar result in a larger validity score being generated.

At block 520, the machine learning system determines whether at least one additional exemplar remains in the training data. If so, the method 500 returns to block 510. If not, the method 500 continues to block 525. Although the illustrated example depicts iteratively refining the model using individual exemplars (e.g., using stochastic gradient descent), in some embodiments, the machine learning system can refine the model based on multiple exemplars simultaneously (e.g., using batch gradient descent).

At block 525, the machine learning system deploys the trained machine learning model for runtime use. In embodiments, this may include deploying the model locally (e.g., for runtime use by the machine learning system) and/or to one or more remote systems. For example, the machine learning system may distribute the trained model to one or more downstream systems, each responsible for one or more residential facilities (e.g., to one or more servers associated with specific care facilities, where these servers may use the model to evaluate the activity of residents at the specific facility).

Figure 6:
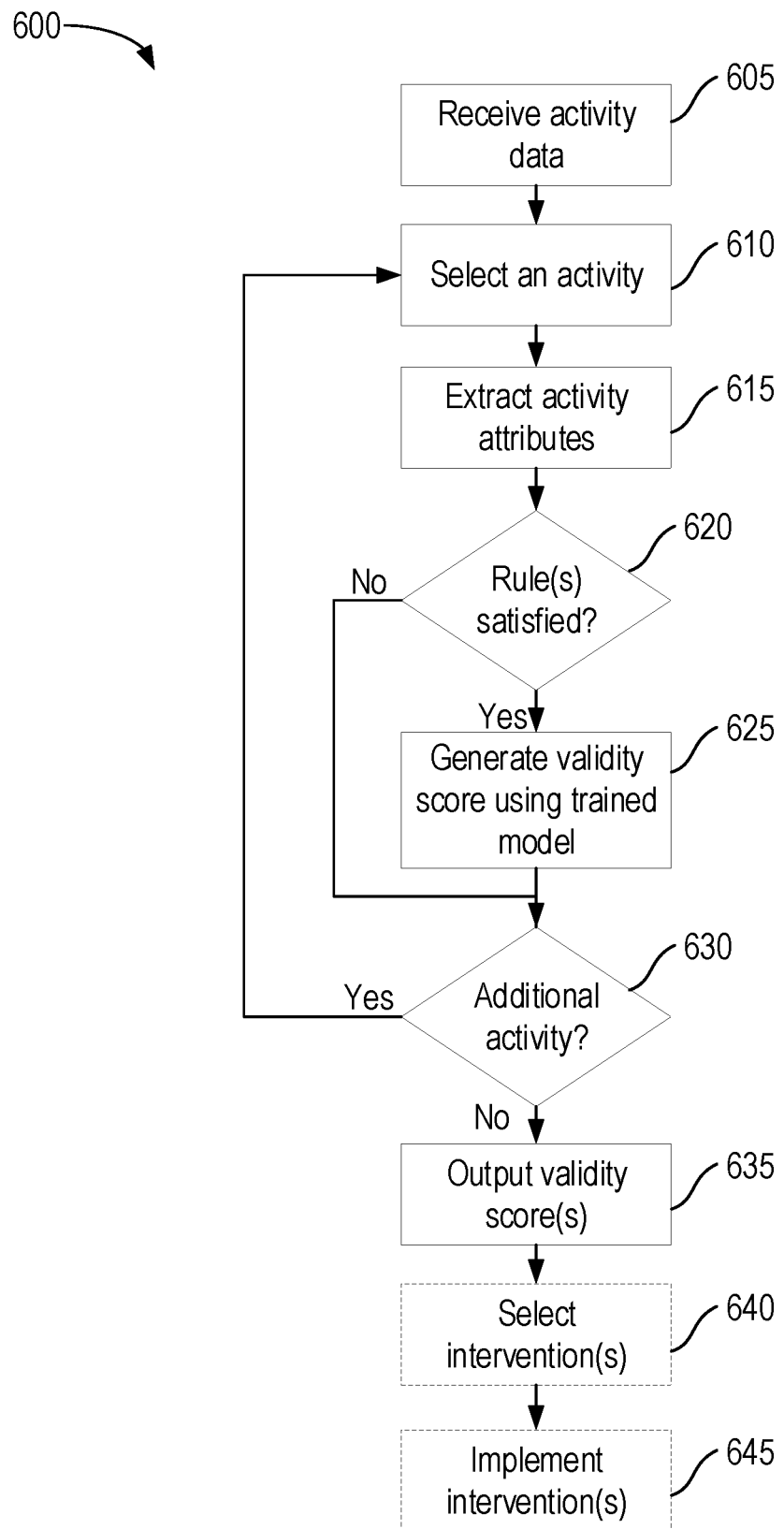
FIG. 6 is a flow diagram depicting an example method for using trained machine learning models to generate validity scores and implement appropriate interventions.

Example Method for Using Trained Machine Learning Models to Generate Validity Scores FIG. 6 is a flow diagram depicting an example method 600 for using trained machine learning models to generate validity scores and implement appropriate interventions. In the illustrated embodiment, the method 600 is performed by a machine learning system, such as the machine learning system 135 of FIG. 1, the machine learning system 235 of FIG. 2, and/or the machine learning system 335 of FIG. 3. In other embodiments, the method 600 can be performed by other systems, such as dedicated inferencing systems.

At block 605, the machine learning system receives activity data (e.g., activity data 205 of FIG. 2). As discussed above, the activity data may include data or information associated with an activity (e.g., a transaction) of a resident (also referred to as a patient or a user in some aspects). In some embodiments, the activity data includes attributes for a transaction with respect to a trust account of a resident residing in a long-term care facility.

In an embodiment, the activity data can generally include information relating to one or more transactions, such as attributes of the participants (e.g., the resident demographics, recipient identity, and the like), the magnitude of the activity, the timing of the activity, the format of the activity, one or more natural language notes describing the activity, and the like. In some embodiments, the received activity data corresponds to current information. That is, the activity data may correspond to a transaction that is current (e.g., that has just occurred, that is being requested, that is ongoing, and the like).

In at least one aspect, the activity data is received because a new transaction has occurred. That is, the activity data may be provided to the machine learning system (e.g., using a push technique) based on determining that a new transaction is either occurring, is requested, or has just completed. In other embodiments, the machine learning system can retrieve or request the activity data, and evaluate it to determine whether any new transactions have occurred.

In some embodiments, the received activity data includes data corresponding to a defined set of features that are used by the machine learning model. In some embodiments, the activity data can include additional data beyond these features (e.g., information about all conditions or diagnoses of the resident, regardless of any specific conditions that are used in the machine learning model). In one such embodiment, the machine learning system can identify and extract the relevant attributes or data, based on the indicated features for the model. In other embodiments, the received activity data may include only the specific data corresponding to the indicated features (e.g., another system may filter the data based on the features, thereby protecting data that is not needed to build the model). In still another aspect, such unused features or attributes may simply be associated with a weight of zero in the model.

At block 610, the machine learning system selects one of the activities indicated in the activity data. In some embodiments, the machine learning system can select from a subset of activities (e.g., only evaluating withdrawals or disbursements). In other embodiments, the machine learning system may select from any type of activity. In at least one embodiment, the machine learning system can use a different model depending on the type of activity. For example, the machine learning system may train and/or use a first model to evaluate the validity of withdrawals or disbursements, while a second model is trained and/or used to evaluate the validity of deposits.

Generally, the activity may be selected using any suitable criteria (including randomly or pseudo-randomly), as the machine learning system will evaluate all of the activities reflected in the activity data during the method 600. Although the illustrated example depicts selecting activities sequentially for conceptual clarity, in embodiments, the machine learning system may select and/or process multiple transactions in parallel.

At block 615, the machine learning system extracts a set of relevant attributes, from the activity data for the selected activity, based on the specified features that are used by the machine learning model. For example, the machine learning system may extract the magnitude and timing of the activity, the recipient, and the like. In some embodiments, if a given attribute cannot be found in the activity data (e.g., if the activity data does not indicate the recipient of the selected transaction), the machine learning system can use predefined value (e.g., a value of zero or a null value), or otherwise use some value that causes the model to ignore the corresponding feature. One example of extracting activity attributes is discussed in more detail below with reference to FIG. 7.

At block 620, the machine learning system determines whether the extracted attributes satisfy one or more defined activity rules. For example, the machine learning system may determine whether the activity is above a defined maximum magnitude (e.g., defined by the resident or by a caregiver or family member). One example of evaluating activity rules is discussed in more detail below with reference to FIG. 9.

If at least one rule is violated, the machine learning system can refrain from any further processing on the selected activity, and the method 600 continues to block 630. That is, the machine learning system may label the activity as invalid (or potentially invalid), and refrain from using the machine learning model to further evaluate it. This can significantly reduce the computational expense of evaluating the resident activity. In other embodiments, the machine learning system may use the machine learning model to evaluate the activity, even if one or more rules are violated. Additionally, though the illustrated example depicts use of the activity rules prior to using the machine learning model, in some aspects, the machine learning system may not use any rules at all (or the rules may be incorporated into the machine learning model).

If no rules were violated (or if the machine learning system determines to use the machine learning model regardless of any rule violations), the method 600 continues to block 625. At block 625, the machine learning system processes the identified/extracted attributes using a trained machine learning model. As discussed above, the machine learning model may generally specify a set of parameters (e.g., weights and/or biases) learned during training. These learned parameters allow the machine learning system to generate a validity score indicating a probability that the selected activity is valid or appropriate, as discussed above. In some embodiments, the machine learning system can additionally or alternatively generate a label for the activity (such as by applying one or more thresholds to the generated validity score). For example, the machine learning system may label the activity as "valid," "invalid," "ambiguous," and the like. One example of generating the validity score is discussed in more detail below with reference to FIG. 10.

At block 630, the machine learning system determines whether there is at least one additional activity remaining to be evaluated. If so, the method 600 returns to block 610. If not, the method 600 continues to block 635.

At block 635, the machine learning system outputs the generated validity score. In embodiments, this may include, for example, outputting it via a display or terminal (e.g., for a caregiver or user to review). In some embodiments, block 635 includes outputting the validity score to one or more other systems (e.g., a storage repository, or other systems that evaluate the validity information to inform allocation or intervention decisions), and the like. In at least one embodiment, the machine learning system only outputs the validity score if one or more criteria are satisfied, such as a threshold validity (e.g., where sufficiently suspicious activity, or activity with a validity score below a threshold, are output for review).

At block 640, the machine learning system (or another system, such as the intervention system 245 of FIG. 2) can optionally select one or more interventions based on the generated validity score. That is, as discussed above, the system may select one or more prophylactic interventions to reduce potential harm based on the activity validity.

In one such embodiment, if the machine learning system determines that the validity scores are problematic, the machine learning system may allocate or suggest additional resources to the resident (such as additional therapy sessions or mental evaluations), instruct a user (e.g., a caregiver) to reach out to the resident to ask about the transaction, prescribe or suggest medications for the resident, and the like. In some embodiments, the system can use other specific and targeted non-medical interventions for the specific resident. For example, the system may provide or suggest financial education for the resident.

In some embodiments, the machine learning system can select interventions based on whether trends in the validity score(s). For example, if the average validity score for the resident has decreased over time (indicating that the resident is engaging in more suspicious transactions), or if the average validity score falls below a threshold, the system may determine that one or more interventions are warranted.

At block 630, the system optionally implements the selected intervention(s). This may include a wide variety of actions, including revised resource allocations, targeted mental evaluations, and the like. One example for implementing interventions is discussed below in more detail with reference to FIG. 11.

Example Method for Extracting Activity Attributes for Machine Learning

Figure 7:
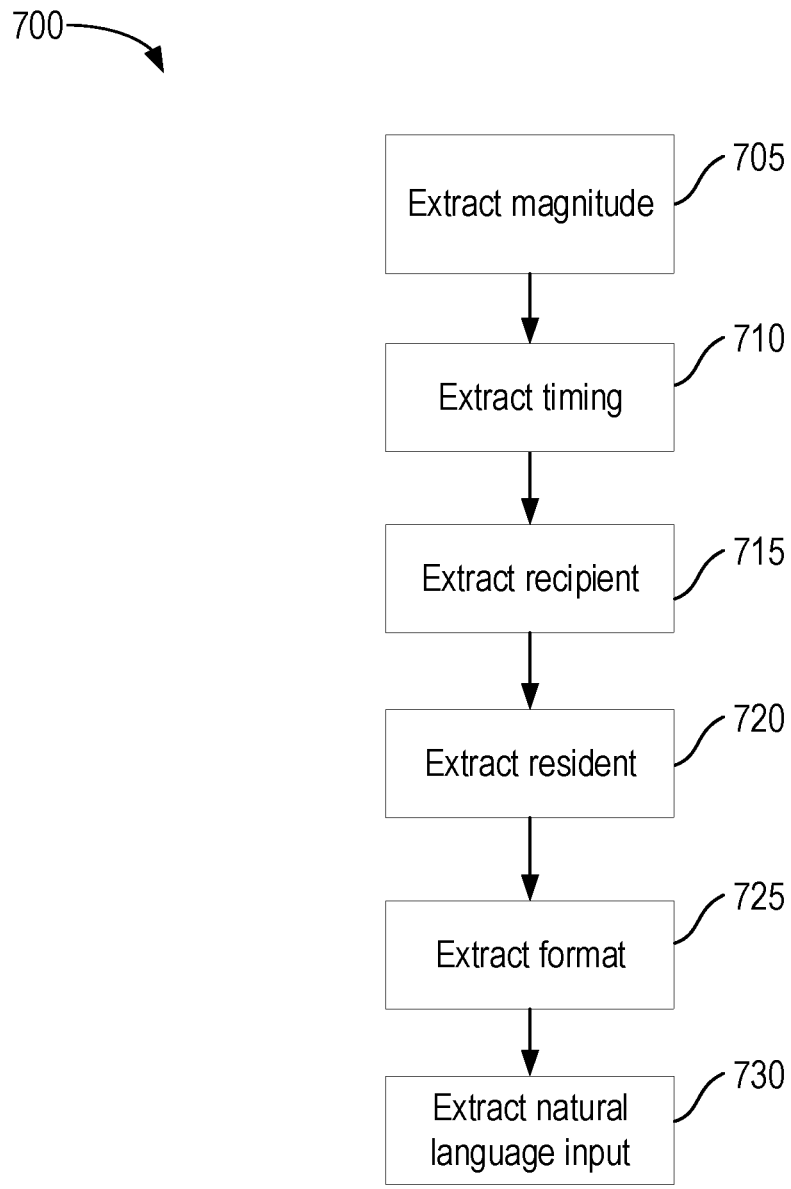
FIG. 7 is a flow diagram depicting an example method for extracting activity attributes for improved machine learning.

FIG. 7 is a flow diagram depicting an example method 700 for extracting activity attributes for improved machine learning. In the illustrated embodiment, the method 700 is performed by a machine learning system, such as the machine learning system 135 of FIG. 1, the machine learning system 235 of FIG. 2, and/or the machine learning system 335 of FIG. 3. In other embodiments, the method 700 can be performed by other systems, such as dedicated training or inference systems. In some embodiments, the method 700 provides additional detail for block 615 of FIG. 6.

At block 705, the machine learning system extracts or determines the magnitude of the activity. For example, the machine learning system may determine the absolute magnitude (e.g., the dollar amount). In some embodiments, extracting the magnitude includes determining the relative magnitude as compared to other activity. For example, the machine learning system may determine the average magnitude of activity (either all time or for a specific window) for the resident or across all residents (or all similar residents), and determine the magnitude of the current activity based on how it compares to the average. For example, magnitudes that are similar to that average may be scaled to a value near 100%, where values above and below the average are scaled appropriately (e.g., to 150% for a magnitude that is 50% larger, or to 50% for a magnitude that is half the average amount). In at least one embodiment, the machine learning system can compare the current activity against other similar activities (e.g., paid to the same recipient for the same or similar services).

At block 710, the machine learning system extracts or determines the timing of the activity. For example, as discussed above, the machine learning system may determine the time of day for the activity, the time of the week, the time of the month, the time of year, and the like.

At block 715, the machine learning system can extract information about the recipient of the activity (or depositor, in the case of a deposit). For example, as discussed above, the machine learning system may determine whether the recipient is a new recipient that has not received disbursements from the resident before (or from any resident in the facility), whether the recipient is an individual or legal entity, whether the recipient is local or remote, and the like.

At block 720, the machine learning system can extract one or more attributes for the resident. For example, as discussed above, the machine learning system may extract the resident's demographics, age, gender, marital status (and, in some embodiments, whether the marital status recently changed, such as within a defined window of time), race, conditions or diagnoses, mental state, and the like.

At block 725, the machine learning system extracts or determines the format of the activity. For example, as discussed above, the machine learning system may determine whether the activity involved a cash disbursement, a check made payable to a specific entity or individual, a check made payable to cash, an electronic or online transfer of funds, and the like.

At block 730, the machine learning system extracts natural language input for the model. For example, the machine learning system may identify and evaluate natural language notes (e.g., notes 130 in FIG. 1, notes 230 in FIG. 2, and/or notes 330 in FIG. 3). In some embodiments, as discussed above, the natural language input can generally correspond to written notes indicating a reason for the activity. In some embodiments, the natural language input can include verbal or recorded notes. For example, a caregiver may record the resident or recipient explaining the reason for the activity. In one such embodiment, one or more speech-to-text techniques can be used to transcribe the note for processing.

In at least one embodiment, the machine learning system can perform one or more preprocessing operations on the natural language text to extract the input. For example, as discussed above with reference to FIG. 4, the machine learning system may extract the text itself, normalize it, remove noise and/or redundant elements, lemmatize it, tokenize it, generate one or more roots for it, vectorize it, and the like. One example for extracting and evaluating the natural language input is described in more detail below with reference to FIG. 8.

Using the method 700, the machine learning system can therefore extract relevant attributes to train machine learning model(s) to predict activity validity, or to be used as input to trained models in order to generate predicted validity during runtime.

Example Method for Preprocessing Unstructured Data for Machine Learning

Figure 8:
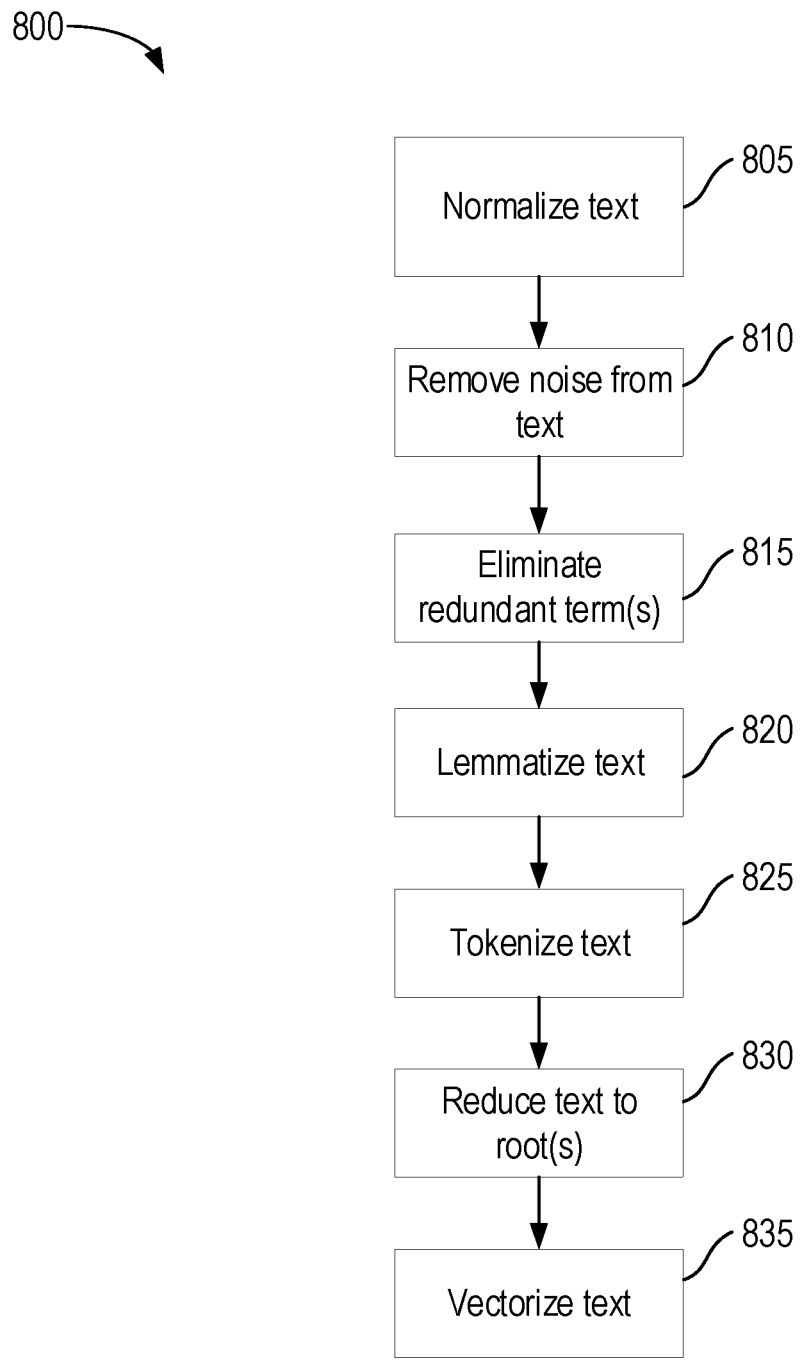
FIG. 8 is a flow diagram depicting an example method for preprocessing unstructured input data to improve machine learning results.

FIG. 8 is a flow diagram depicting an example method 800 for preprocessing unstructured input data to improve machine learning results. In the illustrated embodiment, the method 800 is performed by a machine learning system, such as the machine learning system 135 of FIG. 1, the machine learning system 235 of FIG. 2, and/or the machine learning system 335 of FIG. 3. In other embodiments, the method 800 can be performed by other systems, such as dedicated natural language processing systems or preprocessing systems. In some embodiments, the method 800 provides additional detail for the workflow 400 of FIG. 4, and/or for block 730 in FIG. 7.

Generally, each block in the method 800 is optional, and the machine learning system may perform all of the indicated operations, or some subset thereof. The machine learning system may also use additional preprocessing steps not depicted in the illustrated example. Additionally, though the illustrated example suggests a linear and sequential process for conceptual clarity, in embodiments, the operations may be performed in any order (including entirely or partially in parallel).

At block 805, the machine learning system can normalize the extracted natural language text. As discussed above, this normalization may include a wide variety of text normalization processes, such as converting all characters in the extracted text to lowercase, converting accented or foreign language characters to ASCII characters, expanding contractions, converting words to numeric form where applicable, converting dates to a standard date format, and the like.

At block 810, the machine learning system removes noise from the text. As discussed above, noise removal may include identification and removal of portions of the extracted text that do not carry meaningful or probative value, such as characters, portions, or elements of the text that are not useful or meaningful in the ultimate computing task (e.g., computing a risk score), and/or that are not useful to human readers. For example, the noise removal may include removing extra white or blank spaces, tabs, or lines, removing tags such as HTML tags, and the like.

At block 815, the machine learning system can eliminate redundant elements or terms from the text. As discussed above, this may include identifying and eliminating or removing text corresponding to redundant elements (e.g., duplicate words), and/or the reduction of a sentence or phrase to a portion thereof that is most suitable for machine learning training or application. For example, the redundancy elimination may include eliminating verbs (which may be unhelpful in the machine learning task), conjunctions, or other extraneous words that do not aid the machine learning task.

At block 820, the machine learning system lemmatizes the text. As discussed above, text lemmatization can generally include stemming and/or lemmatization of one or more words in the extracted text. This may include converting words from their inflectional or other form to a base form. For example, lemmatization may include replacing "holding," "holds," and "held" with the base form "hold."

At block 825, the machine learning system tokenizes the text. In an embodiment, tokenizing the text may include transforming or splitting elements in the extracted text (e.g., strings of characters) into smaller elements, also referred to as "tokens." For example, the tokenization may include tokenizing a paragraph into a set of sentences, tokenizing a sentence into a set of words, transforming a word into a set of characters, and the like. In some embodiments, tokenization can additionally or alternatively refer to the replacement of sensitive data with placeholder values for downstream processing. For example, text such as the personal address of the resident may be replaced or masked with a placeholder (referred to as a "token" in some aspects), allowing the remaining text to be evaluated without exposing this private information.

At block 830, the machine learning system can reduce the text to one or more roots. As discussed above, the root generation can include reducing portion of the extracted text (e.g., a phrase or sentence) to its most relevant n-gram (e.g., a bigram) or root for downstream machine learning training and/or application.

At block 835, the machine learning system can vectorize the text. Generally, vectorization may include converting the text into one or more objects that can be represented numerically (e.g., into a vector or tensor form). For example, the machine learning system may use one-hot encodings (e.g., where each element in the vector indicates the presence or absence of a given word, phrase, sentiment, or other concept, based on the value of the element). In some embodiments, the machine learning system can generate one or more word embedding vectors (e.g., generated using all or a portion of a trained machine learning model, such as the initial layer(s) of a feature extraction model). This resulting object can then be processed by downstream natural language processing algorithms or machine learning models to improve the ability of the system to evaluate the text (e.g., to drive more accurate validity prediction).

Example Method for Evaluating Activity Rules to Monitor Validity

Figure 9:
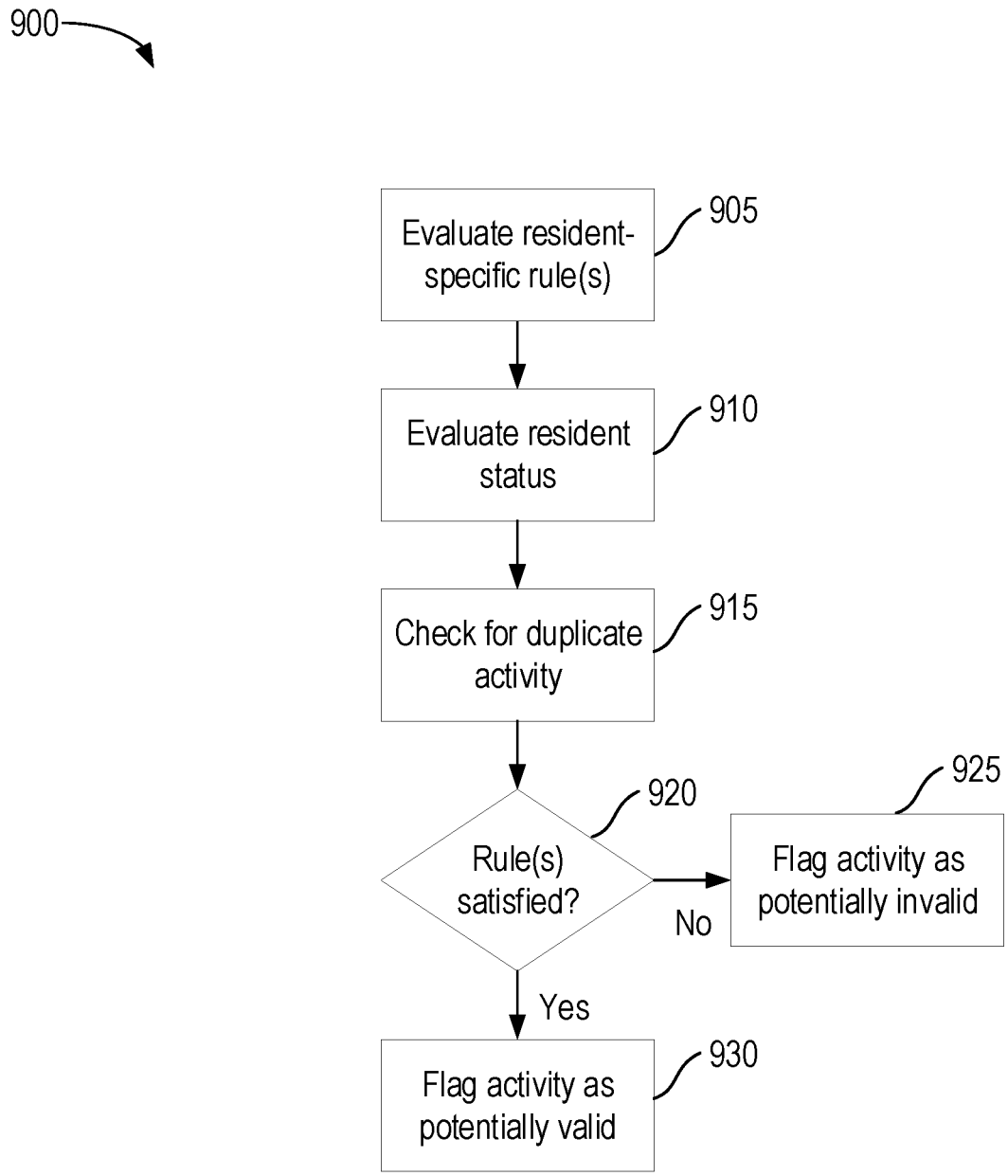
FIG. 9 is a flow diagram depicting an example method for evaluating activity rules to monitor activity validity.

FIG. 9 is a flow diagram depicting an example method 900 for evaluating activity rules to monitor activity validity. In the illustrated embodiment, the method 900 is performed by a machine learning system, such as the machine learning system 135 of FIG. 1, the machine learning system 235 of FIG. 2, and/or the machine learning system 335 of FIG. 3. In other embodiments, the method 900 can be performed by other systems, such as dedicated inferencing systems. In some embodiments, the method 900 provides additional detail for block 620 in FIG. 6.

At block 905, the machine learning system evaluates any resident-specific rules. That is, the machine learning system can determine whether a given activity (e.g., a given transaction in a trust account) satisfies one or more resident-specific defined rules. In some embodiments, residents can define such personal rules. In some embodiments, others (such as caregivers or family) can define one or more resident-specific rules.

The resident-specific rules can generally include a wide variety of conditions or restrictions based on the attributes of a transaction. For example, the resident-specific rules may forbid or flag specific recipients or classes of recipients (or require that the recipient of the activity be on a pre-approved list), forbid or flag activity that exceeds a defined magnitude, forbid or flag activity that fails certain timing criteria, such as overnight, and the like.

At block 910, the machine learning system evaluates the resident's current status (at the time of the activity). For example, the machine learning system may determine whether the resident currently resides in the facility (as opposed to, for example, a hospital or in-patient treatment facility). If the resident is not residing in the facility (or was not residing in the facility at the time of the transaction), the machine learning system may determine that a rule is violated because the resident should not be incurring expense when not present.

At block 915, the machine learning system determines whether the current activity appears to duplicate any other activity (e.g., due to error or maliciousness). For example, the machine learning system may determine whether the activity is similar to other activity within a defined timeframe (e.g., other activity with the same magnitude, other activity to the same recipient, and the like). If so, the machine learning system may determine that the duplicate rule is violated.

At block 920, the machine learning system determines whether any of the rules were violated. Although the illustrated example depicts sequential evaluation of each rule before arriving at block 920, in some embodiments, when a rule is found to be violated the method 900 can proceed directly to block 920 or 925, bypassing further rule evaluation. This can reduce computational expense and latency.

If any rules were violated, the method 900 continues to block 925, where the machine learning system flags the activity as potentially invalid. In some embodiments, the machine learning system can thereafter forgo processing the activity using the machine learning model, which can substantially reduce computational expense. In other embodiments, the machine learning system may proceed to use the machine learning model to evaluate the activity regardless. In at least one embodiment, if any rules are violated, the machine learning system can output the activity and validity determination (or otherwise initiate one or more interventions).

If, at block 920, the machine learning system determines that the activity does not violate any rules, the method 900 continues to block 930. At block 930, the machine learning system flags the activity as potentially valid, or otherwise refrains from flagging it as (potentially) invalid. In some aspects, as discussed above, the machine learning system may then proceed to evaluate the activity using one or more trained machine learning models.

Example Method for Using Machine Learning to Evaluate Activity Validity

Figure 10:
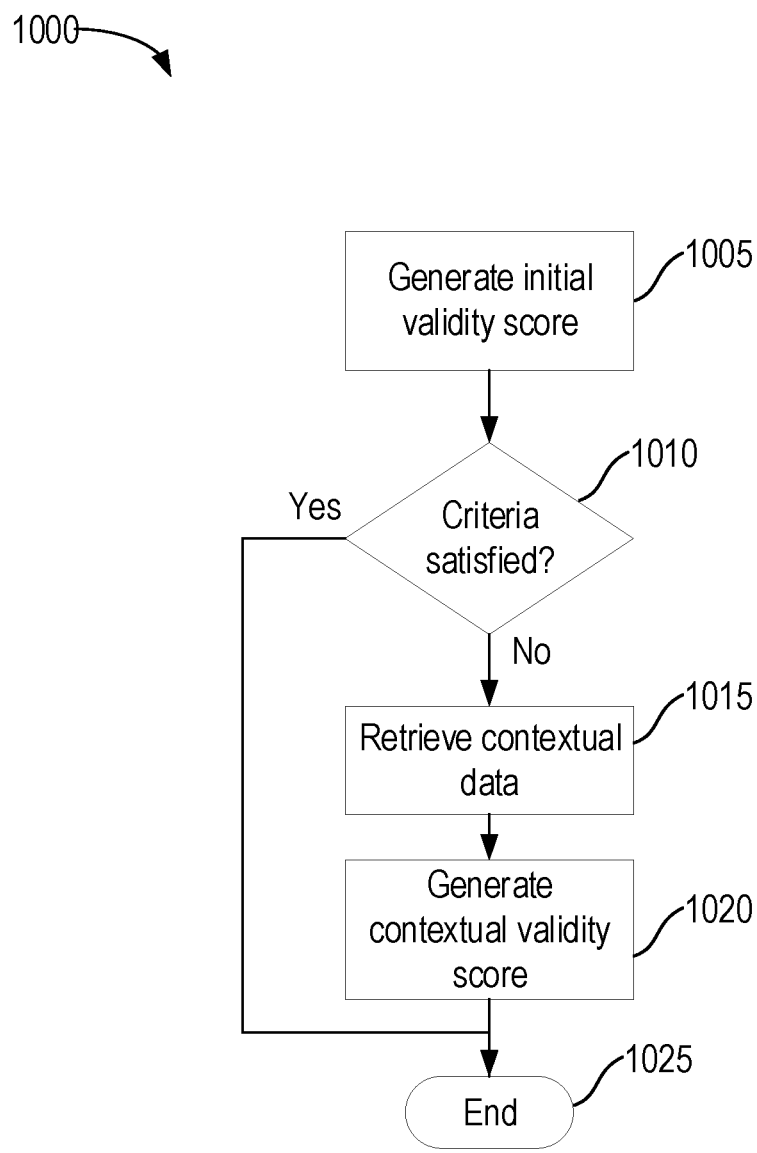
FIG. 10 is a flow diagram depicting an example method for using machine learning to evaluate activity validity.

FIG. 10 is a flow diagram depicting an example method 1000 for using machine learning to evaluate activity validity. In the illustrated embodiment, the method 1000 is performed by a machine learning system, such as the machine learning system 135 of FIG. 1, the machine learning system 235 of FIG. 2, and/or the machine learning system 335 of FIG. 3. In other embodiments, the method 1000 can be performed by other systems, such as dedicated inferencing systems. In some embodiments, the method 1000 provides additional detail for block 625 in FIG. 6.

At block 1005, the machine learning system generate an initial validity score for the activity based on its attributes and characteristics. For example, as discussed above, the machine learning system can generate a score indicating the probability that the activity is valid based on the magnitude of it, the timing of it, the recipient(s), the attributes of the resident, the reason(s) or note(s), and the like.

At block 1010, the machine learning system determines whether the generated initial validity score satisfies one or more criteria. For example, the machine learning system may determine whether the validity score is below a threshold (e.g., whether the activity is sufficiently suspicious). If the criteria are not satisfied, the method 1000 continues to block 1015. If the criteria are satisfied, the machine learning system may label the activity as invalid (or presumptively invalid), and the method 1000 terminates at block 1025. Though the illustrated example depicts bypassing further processing on activity that is presumptively invalid by itself (thereby reducing computational expense), in some embodiments, the block 1010 is skipped and the method 1000 continues to block 1015 regardless.

At block 1015, the machine learning system retrieves contextual data for the current activity. The contextual data can include a variety of data that is exogenous to the specific activity data, such as social media (e.g., posts of the resident indicating an upcoming trip), other activities (e.g., transactions just before or after the current activity), and the like.

At block 1020, the machine learning system can generate a contextual validity score based on this contextual data. In some embodiments, a single machine learning model is used to generate the validity scores discussed above, as well as contextual scores. For example, the contextual data may be provided as input to the machine learning model discussed above. In some embodiments, a second trained machine learning model is used for this contextual evaluation. As one example, recent transactions may result in reduced or increased suspicion for the current activity, or social media posts or other data may provide context and increase the likelihood of validity. For example, in some embodiments, the validity scores of surrounding activity, the cadence of the surrounding activity (e.g., the frequency or temporal closeness of the surrounding activity), and the like may be used as input to one or more machine learning models (or as input to the overall model discussed above) to generate a contextual score for the current activity. The method 1000 then terminate at block 1025.

Figure 11:
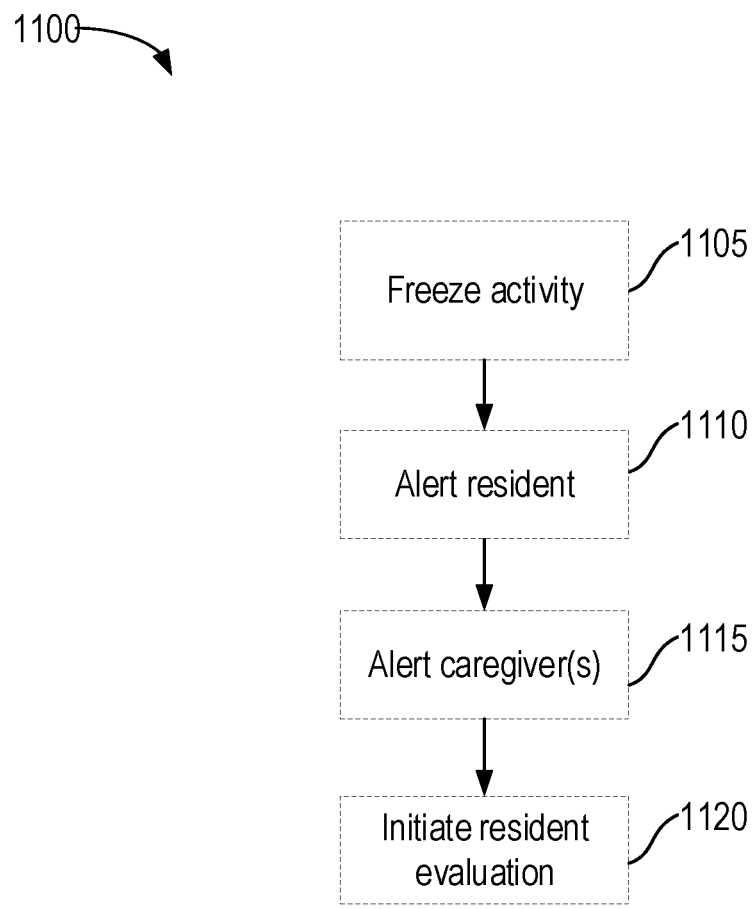
FIG. 11 is a flow diagram depicting an example method for initiating interventions based on machine learning predictions.

Example Method for Initiating Interventions based on Machine Learning Predictions FIG. 11 is a flow diagram depicting an example method 1100 for initiating interventions based on machine learning predictions. In the illustrated embodiment, the method 1100 is performed by a machine learning system, such as the machine learning system 135 of FIG. 1, the machine learning system 235 of FIG. 2, and/or the machine learning system 335 of FIG. 3. In other embodiments, the method 1100 can be performed by other systems, such as dedicated inferencing or intervention systems. In some embodiments, the method 1100 provides additional detail for block 645 in FIG. 6.

At block 1100, the machine learning system can optionally freeze activity for the resident. For example, if the suspicious or invalid activity is ongoing (e.g., more invalid transactions may occur) or not-yet completed, the machine learning system can freeze any further activity on the resident's account, thereby preventing harm.

At block 1110, the machine learning system can optionally alert the resident about the invalid activity. This may allow the resident to quickly respond (e.g., by locking or freezing other accounts), or to indicate that the activity was, in fact, valid.

At block 1115, the machine learning system can optionally alert one or more caregivers for the resident. For example, the machine learning system can identify a trusted caregiver such as a nurse, a trusted family member, and the like. Alerting such trusted users can enable them to quickly respond on behalf of residents who may be unable to respond for themselves (e.g., due to mental or physical condition).

At block 1120, the machine learning system can optionally initiate an updated resident evaluation, such as a new mental evaluation for the resident. For example, the machine learning system may suggest or instruct that a caregiver perform a mental evaluation to determine the resident's state, such as whether they are aware of or understand the activity, or whether they need additional assistance in managing their funds.

Example Method for Refining Machine Learning Models

Figure 12:
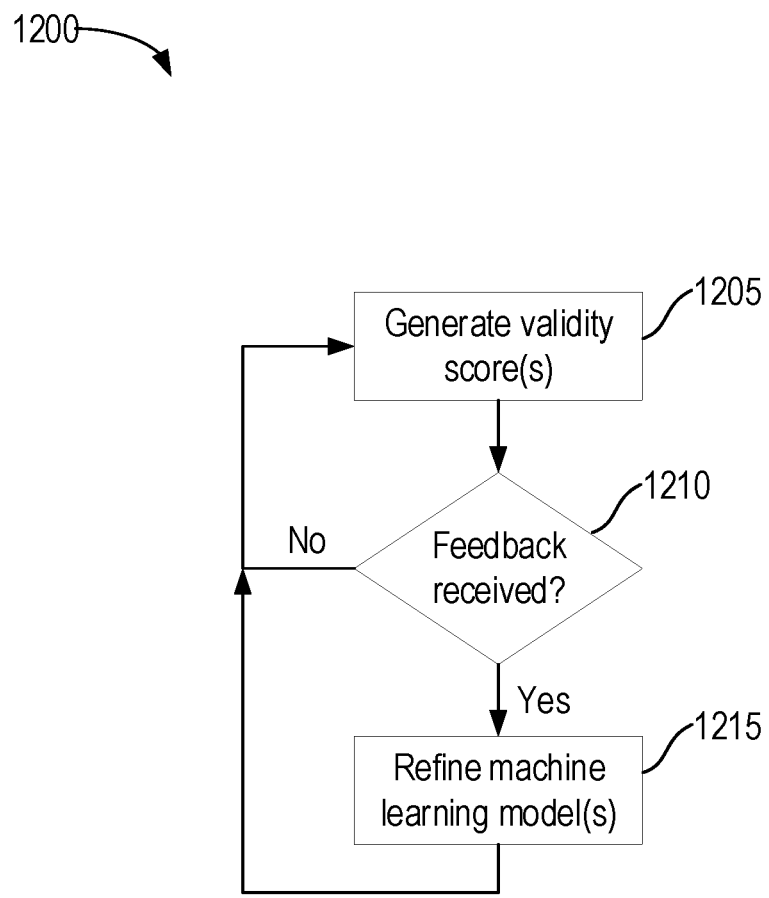
FIG. 12 is a flow diagram depicting an example method for refining machine learning models to generate and evaluate care plans.

FIG. 12 is a flow diagram depicting an example method 1200 for refining machine learning models to generate and evaluate care plans. In the illustrated embodiment, the method 1200 is performed by a machine learning system, such as the machine learning system 135 of FIG. 1, the machine learning system 235 of FIG. 2, and/or the machine learning system 335 of FIG. 3. In other embodiments, the method 1200 can be performed by other systems, such as dedicated inferencing, training, or refinement systems. In some embodiments, the method 1200 provides additional detail for the workflow 300 of FIG. 3.

At block 1205, the machine learning system can generate one or more validity scores for a resident during runtime. That is, the machine learning system may deploy and use a trained machine learning model to process activity data (e.g., transactions associated with a resident trust account) in order to generate validity scores for the transactions reflected in the data. For example, the machine learning system may automatically use the model(s) to generate validity scores for all transactions of all or a subset of the residents in a residential care facility.

At block 1210, the machine learning system (or another system, such as the monitoring system 345 of FIG. 3) determines whether any feedback is available with respect to the validity score(s). For example, the machine learning system may determine whether the resident or another user indicated that any of the activity was valid or invalid. In some embodiments, determining whether feedback is available can include determining whether one or more defined criteria are satisfied, such as whether a defined period of time has elapsed. In one such embodiment, the machine learning system can determine whether a defined period of time has elapsed without receiving any alerts or otherwise canceling or reversing the activity. If so, the machine learning system may determine that feedback is available indicating or suggesting that the activity is valid.

If, at block 1210, the machine learning system determines that feedback is not available, the method 1200 returns to block 1205. If at least one piece of feedback is available (e.g., confirmation or rejection of at least one activity), the method 1200 continues to block 1215, where the machine learning system refines the trained machine learning model(s) based on this updated information. For example, if the generated validity score for an activity was relatively low, but the new data indicates that the activity was valid, the machine learning system may use the prior set of activity attributes (used to generate the original score) as exemplar input that should be correlated with a high validity score. Similarly, if the generated validity score was relatively high but the new data indicates the activity was invalid, the machine learning system may refine the model to indicate that such attributes should be correlated to a lower validity score.

The method 1200 then returns to block 1205. In this way, the machine learning system can continuously or periodically refine the machine learning model(s), thereby ensuring that they continue to produce highly-accurate validity score predictions for resident activity.

Example Method for Generating Validity Scores using Machine Learning

Figure 13:
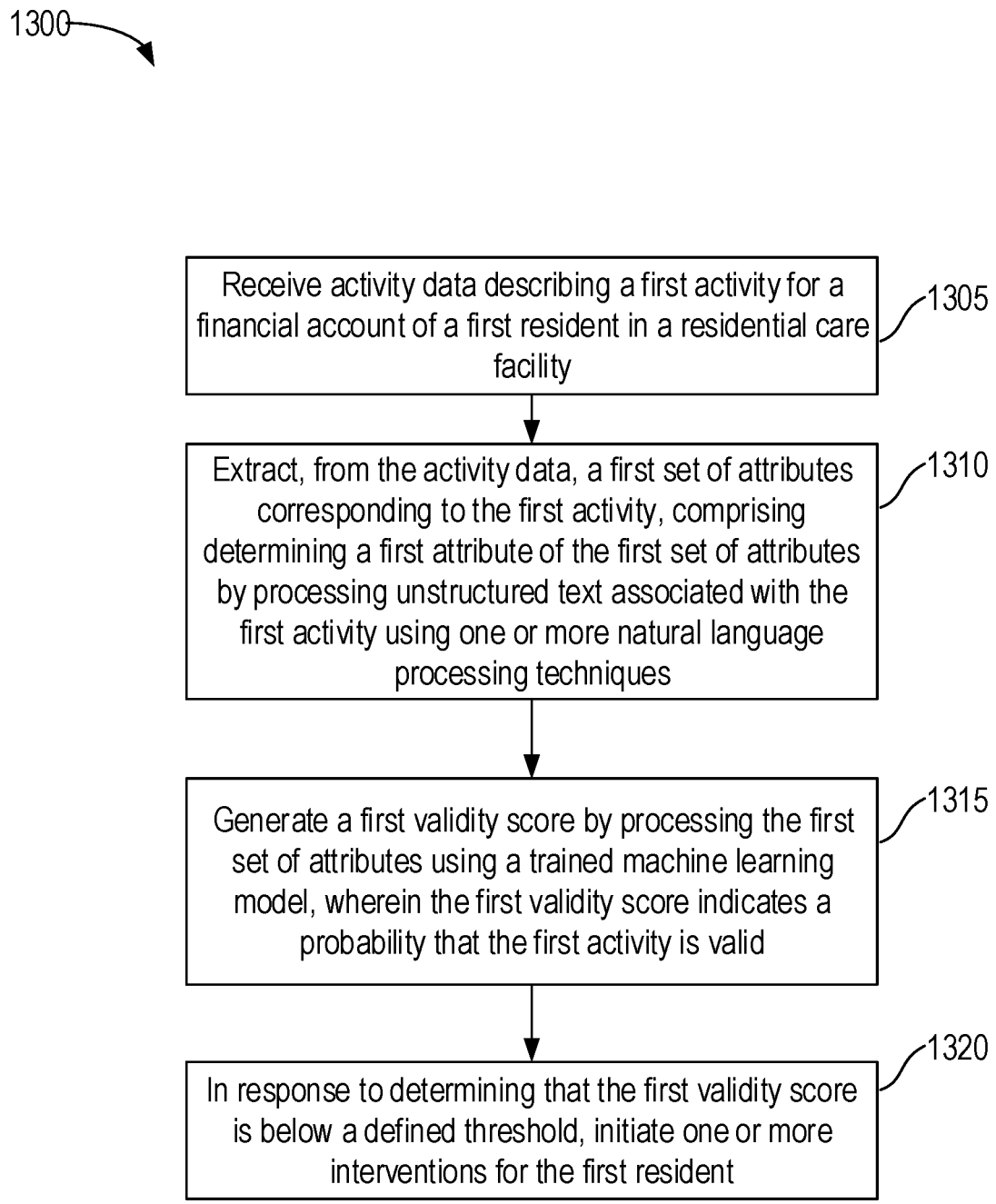
FIG. 13 is a flow diagram depicting an example method for generating validity scores using trained machine learning models.

FIG. 13 is a flow diagram depicting an example method for generating validity scores using trained machine learning models. In the illustrated embodiment, the method 1300 is performed by a machine learning system, such as the machine learning system 135 of FIG. 1, the machine learning system 235 of FIG. 2, and/or the machine learning system 335 of FIG. 3. In other embodiments, the method 1300 can be performed by other systems, such as dedicated inferencing systems.

At block 1305, activity data (e.g., activity data 205 of FIG. 2) describing a first activity for a financial account of a first resident in a residential care facility is received.

At block 1310, a first set of attributes (e.g., magnitude 210, timing 215, participants 220, format 225, and/or notes 230 of FIG. 2) corresponding to the first activity is extracted from the activity data, comprising determining a first attribute of the first set of attributes by processing unstructured text associated with the first activity (e.g., notes 230 of FIG. 2) using one or more natural language processing techniques.

At block 1315, a first validity score (e.g., validity score 240 of FIG. 2) is generated by processing the first set of attributes using a trained machine learning model (e.g., machine learning model 140 of FIG. 1), wherein the first validity score indicates a probability that the first activity is valid.

At block 1320, in response to determining that the first validity score is below a defined threshold, one or more interventions (e.g., interventions 250 of FIG. 2) are initiated for the first resident.

Figure 14:
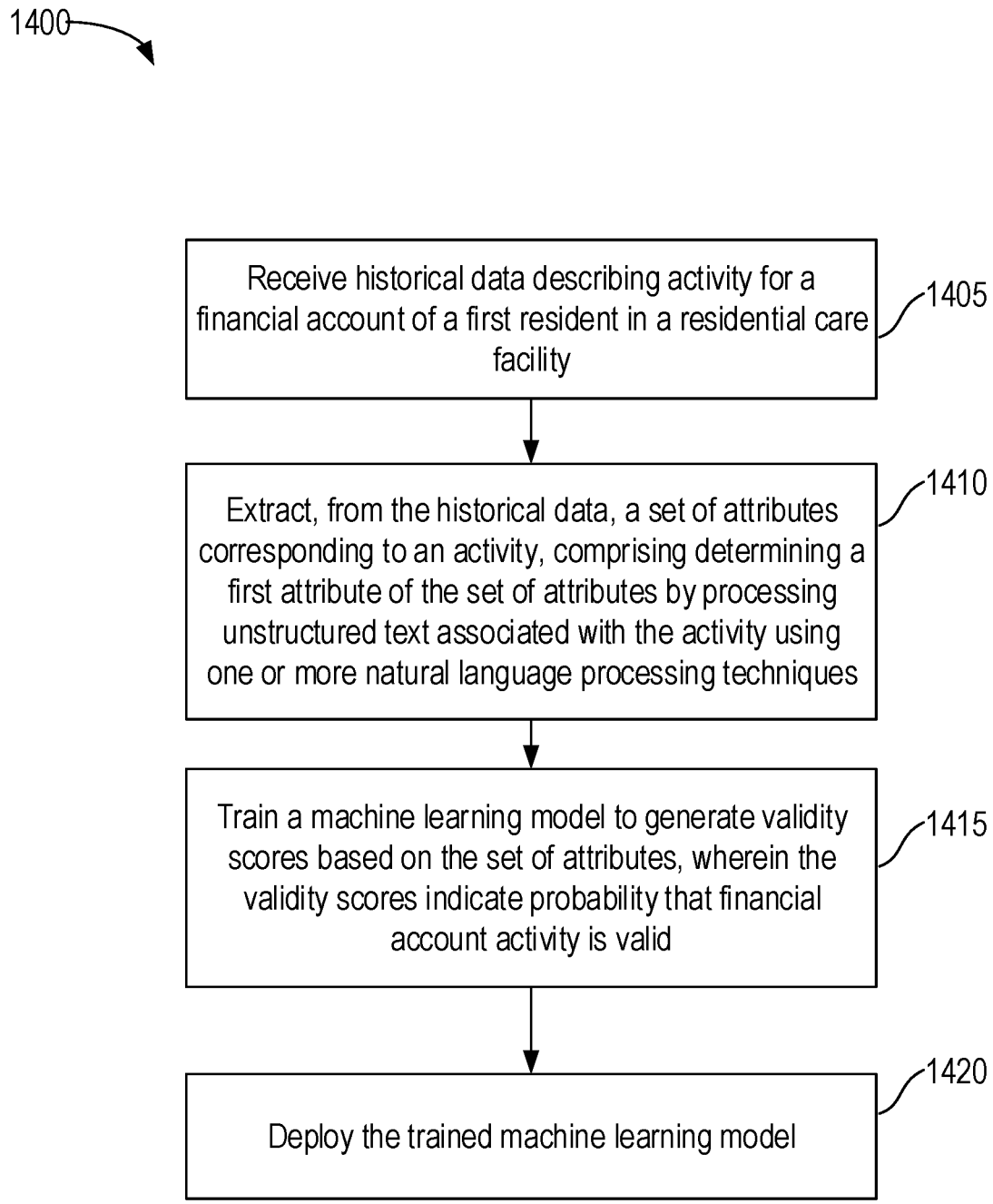
FIG. 14 is a flow diagram depicting an example method for training machine learning models to improve activity evaluation.

Example Method for Training Machine Learning Models to Improve Activity Evaluation FIG. 14 is a flow diagram depicting an example method for training machine learning models to improve activity evaluation. In the illustrated embodiment, the method 1400 is performed by a machine learning system, such as the machine learning system 135 of FIG. 1, the machine learning system 235 of FIG. 2, and/or the machine learning system 335 of FIG. 3. In other embodiments, the method 1400 can be performed by other systems, such as dedicated training or refinement systems.

At block 1405, historical data (e.g., historical data 105 of FIG. 1) describing activity for a financial account of a first resident in a residential care facility is received.

At block 1410, a set of attributes (e.g., magnitude 110, timing 115, participants 120, format 125, and/or notes 130 of FIG. 1) corresponding to an activity is extracted from the historical data, comprising determining a first attribute of the set of attributes by processing unstructured text associated with the activity (e.g., notes 130 of FIG. 1) using one or more natural language processing techniques.

At block 1415, a machine learning model (e.g., machine learning model 140 of FIG. 1) is trained to generate validity scores based on the set of attributes, wherein the validity scores indicate probability that financial account activity is valid.

At block 1420, the trained machine learning model is deployed.

Example Processing System for Improved Machine Learning

Figure 15:
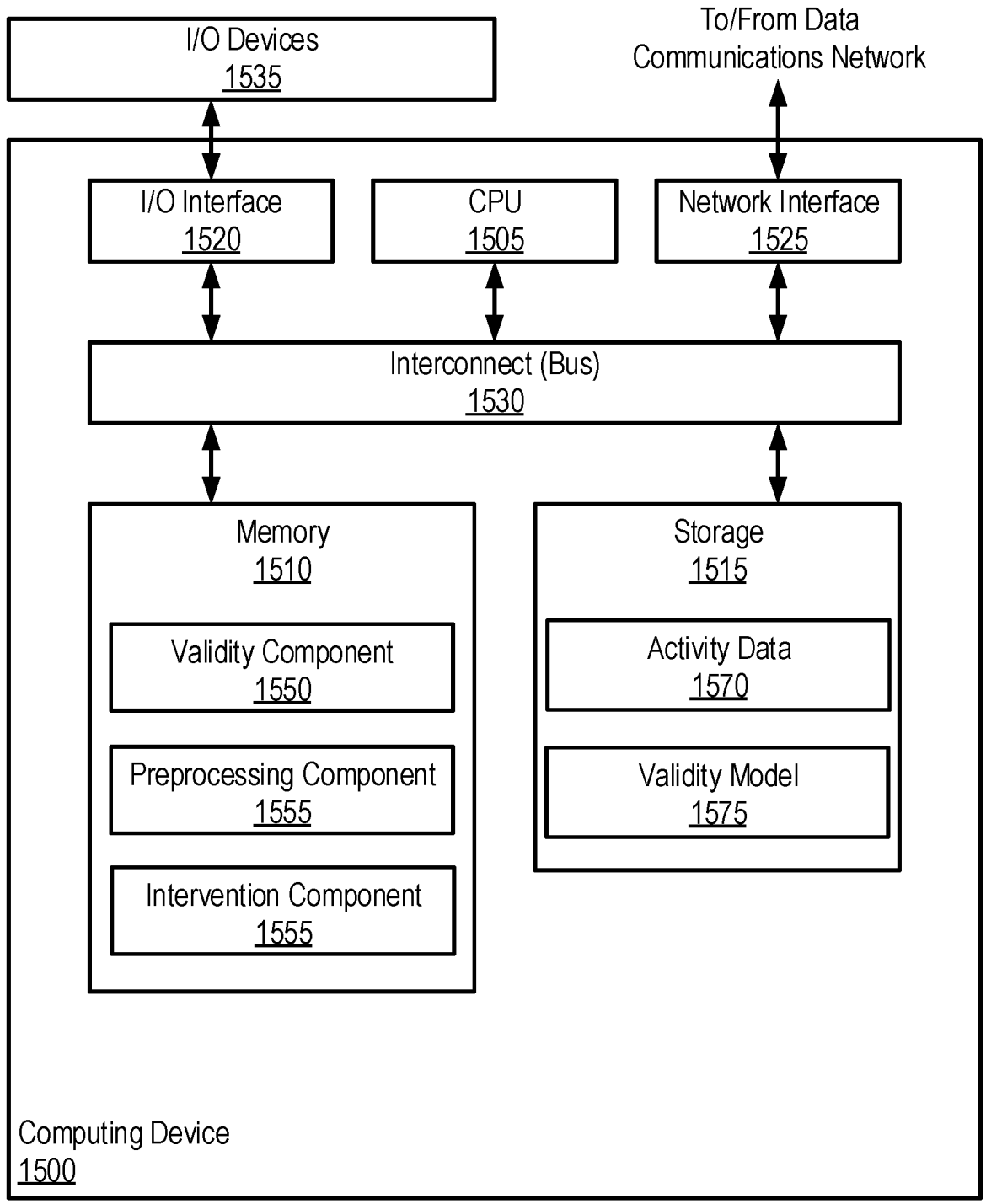
FIG. 15 depicts an example computing device configured to perform various aspects of the present disclosure.

FIG. 15 depicts an example computing device 1500 configured to perform various aspects of the present disclosure. Although depicted as a physical device, in embodiments, the computing device 1500 may be implemented using virtual device(s), and/or across a number of devices (e.g., in a cloud environment). In one embodiment, the computing device 1500 corresponds to the machine learning system 135 of FIG. 1, the machine learning system 235 of FIG. 2, and/or the machine learning system 335 of FIG. 3.

As illustrated, the computing device 1500 includes a CPU 1505, memory 1510, storage 1515, a network interface 1525, and one or more I/O interfaces 1520. In the illustrated embodiment, the CPU 1505 retrieves and executes programming instructions stored in memory 1510, as well as stores and retrieves application data residing in storage 1515. The CPU 1505 is generally representative of a single CPU and/or GPU, multiple CPUs and/or GPUs, a single CPU and/or GPU having multiple processing cores, and the like. The memory 1510 is generally included to be representative of a random access memory. Storage 1515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 1535 (such as keyboards, monitors, etc.) are connected via the I/O interface(s) 1520. Further, via the network interface 1525, the computing device 1500 can be communicatively coupled with one or more other devices and components (e.g., via a network, which may include the Internet, local network(s), and the like). As illustrated, the CPU 1505, memory 1510, storage 1515, network interface(s) 1525, and I/O interface(s) 1520 are communicatively coupled by one or more buses 1530.

In the illustrated embodiment, the memory 1510 includes a validity component 1550, a preprocessing component 1555, and an intervention component 1560, which may perform one or more embodiments discussed above. Although depicted as discrete components for conceptual clarity, in embodiments, the operations of the depicted components (and others not illustrated) may be combined or distributed across any number of components. Further, although depicted as software residing in memory 1510, in embodiments, the operations of the depicted components (and others not illustrated) may be implemented using hardware, software, or a combination of hardware and software.

In one embodiment, the validity component 1550 is used to generate or extract input data and train machine learning models (e.g., based on historical data), such as discussed above with reference to FIGS. 1-3, 5-7, and/or 9-14. In some embodiments, the validity component 1550 is also used to generate validity scores using trained models, such as discussed above with reference to FIGS. 1-3, 5-7, and/or 9-14. The preprocessing component 1555 may generally be used to perform any needed or desired preprocessing on the data, such as text preprocessing (e.g., including normalization), as discussed above with reference to FIGS. 4 and 8. The intervention component 1560 may be configured to use the generated risk scores to select, generate, and/or implement various interventions (such as alerts, prophylactic and specific/personalized interventions, and the like), as discussed above with reference to FIGS. 2, 6, 11, and/or 14.

In the illustrated example, the storage 1515 includes activity data 1570 (which may correspond to historical data, such as historical data 105 of FIG. 1, and/or to current activity data, such as activity data 205 of FIG. 2 and/or activity data 305 of FIG. 3), as well as a validity model 1575 (which may correspond to the machine learning model 140 of FIG. 1). Although depicted as residing in storage 1515, the activity data 1570 and validity model 1575 may be stored in any suitable location, including memory 1510.

EXAMPLE CLAUSES

Implementation examples are described in the following numbered clauses:

Clause 1: A method, comprising: receiving activity data describing a first activity for a financial account of a first resident in a residential care facility; extracting, from the activity data, a first set of attributes corresponding to the first activity, comprising: determining a first attribute of the first set of attributes by processing unstructured text associated with the first activity using one or more natural language processing techniques; generating a first validity score by processing the first set of attributes using a trained machine learning model, wherein the first validity score indicates a probability that the first activity is valid; and in response to determining that the first validity score is below a defined threshold, initiating one or more interventions for the first resident.

Clause 2: The method of Clause 1, wherein determining the first attribute comprises: identifying a field comprising natural language text describing a reason for the first activity; and generating a vector representation of the natural language text.

Clause 3: The method of any one of Clauses 1-2, wherein determining the first attribute further comprises preprocessing the natural language text prior to generating the vector representation, comprising: normalizing the natural language text; and removing noise from the normalized natural language text.

Clause 4: The method of any one of Clauses 1-3, wherein the first set of attributes further comprise: at least one attribute corresponding to a magnitude of the first activity; at least one attribute corresponding to a recipient of the first activity; at least one attribute corresponding to a time of the first activity; at least one attribute corresponding to a form of the first activity; and at least one attribute corresponding to characteristics of the first resident.

Clause 5: The method of any one of Clauses 1-4, wherein the one or more interventions comprise: identifying a trusted caregiver of the first resident; and outputting an alert to the trusted caregiver, wherein the alert comprises: an indication of the first activity; and a suggestion to question the first resident regarding the first activity.

Clause 6: The method of any one of Clauses 1-5, wherein the activity data further describes a plurality of activities for the financial account of the first resident, the method further comprising: for each respective activity of the plurality of activities: extracting, from the activity data, a respective set of attributes corresponding to the respective activity; and generating a respective validity score by processing the respective set of attributes using the trained machine learning model.

Clause 7: The method of any one of Clauses 1-6, wherein the machine learning model was trained by: receiving a pre-trained machine learning model previously trained based on historical data for a plurality of residents; and generating the machine learning model by fine-tuning the pre-trained machine learning model using the activity data for the first resident.

Clause 8: The method of any one of Clauses 1-7, wherein the financial account of the first resident corresponds to funds managed by the residential care facility on behalf of the first resident.

Clause 9: A method, comprising, receiving historical data describing activity for a financial account of a first resident in a residential care facility; extracting, from the historical data, a set of attributes corresponding to an activity, comprising: determining a first attribute of the set of attributes by processing unstructured text associated with the activity using one or more natural language processing techniques; training a machine learning model to generate validity scores based on the set of attributes, wherein the validity scores indicate probability that financial account activity is valid; and deploying the trained machine learning model.

Clause 10: The method of Clause 9, wherein determining the first attribute comprises: identifying a field comprising natural language text describing a reason for the activity; and generating a vector representation of the natural language text.

Clause 11: The method of any one of Clauses 9-10, wherein determining the first attribute further comprises preprocessing the natural language text prior to generating the vector representation, comprising: normalizing the natural language text; and removing noise from the normalized natural language text.

Clause 11: The method of any one of Clauses 9-10, wherein the set of attributes further comprise: at least one attribute corresponding to a magnitude of the activity; at least one attribute corresponding to a recipient of the activity; at least one attribute corresponding to a time of the activity; at least one attribute corresponding to a form of the activity; and at least one attribute corresponding to characteristics of the first resident.

Clause 11: The method of any one of Clauses 9-10, wherein training the machine learning model comprises: receiving a pre-trained machine learning model previously trained based on historical data for a plurality of residents; and generating the machine learning model by fine-tuning the pre-trained machine learning model using the historical data for the first resident.

Clause 14: A system, comprising: a memory comprising computer-executable instructions; and one or more processors configured to execute the computer-executable instructions and cause the processing system to perform a method in accordance with any one of Clauses 1-13.

Clause 15: A system, comprising means for performing a method in accordance with any one of Clauses 1-13.

Clause 16: A non-transitory computer-readable medium comprising computer-executable instructions that, when executed by one or more processors of a processing system, cause the processing system to perform a method in accordance with any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or systems (e.g., the machine learning system 135 of FIG. 1, 235 of FIG. 2, and/or 335 of FIG. 3) or related data available in the cloud. For example, the machine learning system could execute on a computing system in the cloud and train and/or use machine learning models. In such a case, the machine learning system 135 could train models to generate validity scores, and store the models at a storage location in the cloud. Doing so allows a user to access this information from any computing system attached to a network connected to the cloud (e.g., the Internet).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving activity data describing a first activity for a financial account of a first resident in a residential care facility;
extracting, from the activity data, a first set of attributes corresponding to the first activity, comprising:
determining a first attribute of the first set of attributes by processing unstructured text associated with the first activity using one or more natural language processing techniques;
generating a first validity score by processing the first set of attributes using one or more machine learning models, wherein the first validity score indicates a probability that the first activity is valid;
in response to determining that the first validity score is below a defined threshold:
retrieving additional contextual data for the first activity; and
generating a contextual validity score based on processing the additional contextual data using one or more machine learning models; and
initiating one or more interventions for the first resident based on the first validity score and the contextual validity score.

2. The method of claim 1, wherein determining the first attribute comprises:
identifying a field comprising natural language text describing a reason for the first activity; and
generating a vector representation of the natural language text.

3. The method of claim 2, wherein determining the first attribute further comprises preprocessing the natural language text prior to generating the vector representation, comprising:
normalizing the natural language text; and
removing noise from the normalized natural language text.

4. The method of claim 1, wherein the first set of attributes further comprise:
at least one attribute corresponding to a magnitude of the first activity;
at least one attribute corresponding to a recipient of the first activity;
at least one attribute corresponding to a time of the first activity;
at least one attribute corresponding to a form of the first activity; and
at least one attribute corresponding to characteristics of the first resident.

5. The method of claim 1, wherein the one or more interventions comprise:
identifying a trusted caregiver of the first resident; and
outputting an alert to the trusted caregiver, wherein the alert comprises:
an indication of the first activity; and
a suggestion to question the first resident regarding the first activity.

6. The method of claim 1, wherein the activity data further describes a plurality of activities for the financial account of the first resident, the method further comprising:
for each respective activity of the plurality of activities:
extracting, from the activity data, a respective set of attributes corresponding to the respective activity; and
generating a respective validity score by processing the respective set of attributes using the trained machine learning model.

7. The method of claim 1, wherein the machine learning model was trained by:
receiving a pre-trained machine learning model previously trained based on historical data for a plurality of residents; and
generating the machine learning model by fine-tuning the pre-trained machine learning model using the activity data for the first resident.

8. The method of claim 1, wherein the financial account of the first resident corresponds to funds managed by the residential care facility on behalf of the first resident.

9. A non-transitory computer-readable storage medium comprising computer-readable program code that, when executed using one or more computer processors, performs an operation comprising:
receiving activity data describing a first activity for a financial account of a first resident in a residential care facility;
extracting, from the activity data, a first set of attributes corresponding to the first activity, comprising:
determining a first attribute of the first set of attributes by processing unstructured text associated with the first activity using one or more natural language processing techniques;
generating a first validity score by processing the first set of attributes using a trained machine learning model, wherein the first validity score indicates a probability that the first activity is valid;
in response to determining that the first validity score is below a defined threshold, initiating one or more interventions for the first resident;
receiving second activity data describing a second activity for the financial account;
extracting, from the second activity data, a second set of attributes corresponding to the second activity; and
in response to determining that the second set of attributes fails to satisfy one or more rules for the first resident:
refraining from processing the second set of attributes using the trained machine learning model; and
initiating one or more additional interventions for the first resident.

10. The non-transitory computer-readable storage medium of claim 9, wherein determining the first attribute comprises:
identifying a field comprising natural language text describing a reason for the first activity; and
generating a vector representation of the natural language text.

11. The non-transitory computer-readable storage medium of claim 10, wherein determining the first attribute further comprises preprocessing the natural language text prior to generating the vector representation, comprising:
normalizing the natural language text; and
removing noise from the normalized natural language text.

12. The non-transitory computer-readable storage medium of claim 9, wherein the first set of attributes further comprise:
at least one attribute corresponding to a magnitude of the first activity;
at least one attribute corresponding to a recipient of the first activity;
at least one attribute corresponding to a time of the first activity;
at least one attribute corresponding to a form of the first activity; and
at least one attribute corresponding to characteristics of the first resident.

13. The non-transitory computer-readable storage medium of claim 9, wherein the one or more interventions comprise:
identifying a trusted caregiver of the first resident; and
outputting an alert to the trusted caregiver, wherein the alert comprises:
an indication of the first activity; and
a suggestion to question the first resident regarding the first activity.

14. The non-transitory computer-readable storage medium of claim 9, wherein the activity data further describes a plurality of activities for the financial account of the first resident, the operation further comprising:
for each respective activity of the plurality of activities:
extracting, from the activity data, a respective set of attributes corresponding to the respective activity; and
generating a respective validity score by processing the respective set of attributes using the trained machine learning model.

15. The non-transitory computer-readable storage medium of claim 9, wherein the machine learning model was trained by:
receiving a pre-trained machine learning model previously trained based on historical data for a plurality of residents; and
generating the machine learning model by fine-tuning the pre-trained machine learning model using the activity data for the first resident.

16. A method, comprising:
receiving historical data describing activity for a financial account of a first resident in a residential care facility;
extracting, from the historical data, a set of attributes corresponding to an activity, comprising:
determining a first attribute of the set of attributes by processing unstructured text associated with the activity using one or more natural language processing techniques;
training a machine learning model to generate validity scores based on the set of attributes, wherein the validity scores indicate probability that financial account activity is valid;
generating a first validity score by processing a new set of attributes using the trained machine learning model, wherein the first validity score indicates a probability that a first activity is valid;
in response to determining that the first validity score is below a defined threshold:
retrieving additional contextual data for the first activity; and
generating a contextual validity score based on processing the additional contextual data using a second machine learning model; and initiating one or more interventions based on the first validity score and the contextual validity score.

17. The method of claim 16, wherein determining the first attribute comprises:
identifying a field comprising natural language text describing a reason for the activity; and
generating a vector representation of the natural language text.

18. The method of claim 17, wherein determining the first attribute further comprises preprocessing the natural language text prior to generating the vector representation, comprising:
normalizing the natural language text; and
removing noise from the normalized natural language text.

19. The method of claim 16, wherein the set of attributes further comprise:
at least one attribute corresponding to a magnitude of the activity;
at least one attribute corresponding to a recipient of the activity;
at least one attribute corresponding to a time of the activity;
at least one attribute corresponding to a form of the activity; and
at least one attribute corresponding to characteristics of the first resident.

20. The method of claim 16, wherein training the machine learning model comprises:
receiving a pre-trained machine learning model previously trained based on historical data for a plurality of residents; and
generating the machine learning model by fine-tuning the pre-trained machine learning model using the historical data for the first resident.

* * * * *